US012562043B2

(12) United States Patent
Kim et al.

(10) Patent No.: US 12,562,043 B2
(45) Date of Patent: Feb. 24, 2026

(54) METHOD FOR DETECTING FALL OF USER AND ELECTRONIC DEVICE SUPPORTING THE SAME

(71) Applicant: SAMSUNG ELECTRONICS CO., LTD., Suwon-si (KR)

(72) Inventors: Hyeonseong Kim, Suwon-si (KR); Minkyung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 18/602,700

(22) Filed: Mar. 12, 2024

(65) Prior Publication Data

US 2024/0321075 A1 Sep. 26, 2024

(30) Foreign Application Priority Data

Mar. 24, 2023 (KR) ........................ 10-2023-0038854
May 15, 2023 (KR) ........................ 10-2023-0062476

(51) Int. Cl.
*G08B 21/04* (2006.01)

(52) U.S. Cl.
CPC ....... *G08B 21/043* (2013.01); *G08B 21/0446* (2013.01)

(58) Field of Classification Search
CPC .......................... G08B 21/043; G08B 21/0446
See application file for complete search history.

(56) References Cited

U.S. PATENT DOCUMENTS 7,402,142 B2 * 7/2008 Kawai .................. B62D 57/032 600/595
8,206,325 B1 * 6/2012 Najafi .................. A61B 5/0022 600/595

(Continued)

FOREIGN PATENT DOCUMENTS

EP 3238012 B1 7/2021
KR 10-2016-0079664 A 7/2016

(Continued)

OTHER PUBLICATIONS

International Search Report (PCT/ISA/210) issued on May 7, 2024 by the International Searching Authority in International Application No. PCT/KR2024/002094.

(Continued)

*Primary Examiner* — Curtis J King
(74) *Attorney, Agent, or Firm* — Sughrue Mion, PLLC

(57) ABSTRACT

An electronic device includes: a communication circuit; a first sensor; a processor; and memory storing instructions that cause the electronic device to: determine whether a user wearing the electronic device is in a standing posture; determine that the electronic device is a main electronic device and an external electronic device connected to the electronic device is a sub electronic device, based on determining that the user is in the standing posture; obtain first information related to a fall of the user; receive, from the external electronic device through the communication circuit, second information related to the fall of the user. The second information is obtained by the external electronic device; and detect the fall of the user, by applying a first weight to the first information and by applying a second weight corresponding to the sub electronic device. The second weight is lower than the first weight.

20 Claims, 18 Drawing Sheets

(56) References Cited

U.S. PATENT DOCUMENTS

| | | | | | |
|---|---|---|---|---|---|
| 8,591,411 | B2 * | 11/2013 | Banet | A61B 5/00 | 600/300 |
| 8,622,747 | B2 * | 1/2014 | Chu | A63B 22/0235 | 434/258 |
| 8,753,275 | B2 * | 6/2014 | Najafi | A61B 5/112 | 600/592 |
| 8,773,256 | B2 * | 7/2014 | Ten Kate | G08B 21/04 | 600/595 |
| 9,138,174 | B2 * | 9/2015 | Jin | A61B 5/1117 | |
| 9,551,804 | B1 * | 1/2017 | Kechichian | A61B 5/1117 | |
| 10,307,111 | B2 * | 6/2019 | Muhsin | A61B 5/14551 | |
| 10,824,132 | B2 * | 11/2020 | Horseman | G05B 19/406 | |
| 10,878,352 | B2 * | 12/2020 | Morgenthau | G06Q 10/103 | |
| 11,000,078 | B2 * | 5/2021 | Jin | A41D 1/002 | |
| 11,436,806 | B1 * | 9/2022 | Katz | A61B 5/7425 | |
| 11,759,125 | B2 * | 9/2023 | Ladd | G09B 5/02 | 434/247 |
| 11,819,334 | B2 * | 11/2023 | Dugan | A61B 5/0059 | |
| 11,881,096 | B2 * | 1/2024 | Samadani | G08B 21/043 | |
| 11,906,540 | B1 * | 2/2024 | Gwin | G06N 20/20 | |
| 11,967,217 | B1 * | 4/2024 | Andrews | G08B 29/186 | |
| 12,095,940 | B2 * | 9/2024 | Anderson | G08B 21/043 | |
| 12,354,750 | B2 * | 7/2025 | Sjoquist | G16H 40/63 | |
| 2003/0058111 | A1 * | 3/2003 | Lee | G08B 13/19641 | 348/E7.086 |
| 2003/0058341 | A1 * | 3/2003 | Brodsky | G06V 20/52 | 348/E7.086 |
| 2007/0063850 | A1 * | 3/2007 | Devaul | A61B 5/0024 | 340/573.1 |
| 2009/0240170 | A1 * | 9/2009 | Rowley | A61B 5/6831 | 600/595 |
| 2009/0322540 | A1 | 12/2009 | Richardson et al. | | |
| 2010/0316253 | A1 * | 12/2010 | Yang | G08B 21/0492 | 382/103 |
| 2011/0152727 | A1 * | 6/2011 | Ten Kate | A61B 5/6829 | 600/595 |
| 2011/0162433 | A1 * | 7/2011 | Peng | G08B 21/0446 | 73/1.13 |
| 2011/0230791 | A1 * | 9/2011 | Ten Kate | A61B 5/1117 | 600/595 |
| 2013/0143519 | A1 * | 6/2013 | Doezema | A61B 5/681 | 455/404.2 |
| 2013/0346021 | A1 * | 12/2013 | Stevens | A61B 5/11 | 702/160 |
| 2014/0150530 | A1 * | 6/2014 | Ten Kate | G08B 21/043 | 73/37 |
| 2015/0065919 | A1 * | 3/2015 | Cuevas | A61B 5/746 | 600/587 |
| 2015/0123802 | A1 * | 5/2015 | Oddsson | A61B 5/486 | 340/573.7 |
| 2015/0221202 | A1 * | 8/2015 | Russell | A61B 5/1117 | 340/573.7 |
| 2016/0110986 | A1 * | 4/2016 | Rosenblood | A61B 5/4561 | 340/573.7 |
| 2016/0203692 | A1 * | 7/2016 | Ten Kate | G08B 21/0446 | 340/573.1 |
| 2017/0281056 | A1 * | 10/2017 | Raanan | A61B 5/6831 | |
| 2018/0000385 | A1 * | 1/2018 | Heaton | G08B 25/016 | |
| 2018/0342081 | A1 * | 11/2018 | Kim | G08B 21/043 | |
| 2019/0167156 | A1 | 6/2019 | Heaton et al. | | |
| 2019/0350517 | A1 | 11/2019 | Marlinski | | |
| 2020/0015712 | A1 * | 1/2020 | Hayashida | G08B 21/0446 | |
| 2020/0179217 | A1 | 6/2020 | Aprigliano et al. | | |
| 2020/0342735 | A1 * | 10/2020 | Tan | G01C 5/06 | |
| 2021/0121098 | A1 * | 4/2021 | Rosenblood | A61B 5/4561 | |
| 2021/0169417 | A1 * | 6/2021 | Burton | A61B 5/4857 | |
| 2021/0209921 | A1 | 7/2021 | Lin et al. | | |
| 2021/0248893 | A1 * | 8/2021 | Van Dinther | G08B 25/016 | |
| 2022/0054848 | A1 * | 2/2022 | Szul | G06F 3/011 | |
| 2022/0054849 | A1 * | 2/2022 | Engman | A61N 1/3968 | |
| 2022/0062019 | A1 * | 3/2022 | Xiao | A61F 5/026 | |
| 2022/0139204 | A1 * | 5/2022 | Millican | H04N 23/6812 | 340/573.1 |
| 2022/0183591 | A1 * | 6/2022 | Korhonen | G16H 50/30 | |
| 2023/0081657 | A1 * | 3/2023 | Zaphrir | G16H 10/60 | 600/301 |
| 2023/0123441 | A1 * | 4/2023 | Kaji | A61B 5/1123 | 73/865.4 |
| 2023/0252874 | A1 * | 8/2023 | ElDelgawy | G08B 21/043 | 340/573.1 |
| 2024/0157900 | A1 * | 5/2024 | Lambert | B60Q 9/008 | |
| 2024/0164664 | A1 | 5/2024 | Du et al. | | |
| 2024/0220183 | A1 * | 7/2024 | Ikeya | H04L 67/131 | |
| 2024/0257392 | A1 * | 8/2024 | Hazeli | G08B 21/043 | |
| 2024/0285189 | A1 * | 8/2024 | Amir | G08B 21/043 | |
| 2024/0299784 | A1 * | 9/2024 | Carroccia | A62B 35/04 | |
| 2025/0098984 | A1 * | 3/2025 | Bonev | G16H 10/60 | |

FOREIGN PATENT DOCUMENTS

| | | | |
|---|---|---|---|
| KR | 10-2017-0095041 | A | 8/2017 |
| KR | 10-2018-0082029 | A | 7/2018 |
| KR | 10-2019-0116781 | A | 10/2019 |
| KR | 10-2199204 | B1 | 1/2021 |
| KR | 10-2021-0059377 | A | 5/2021 |
| KR | 10-2021-0136323 | A | 11/2021 |

OTHER PUBLICATIONS

Written Opinion (PCT/ISA/237) issued on May 7, 2024 by the International Searching Authority in International Application No. PCT/KR2024/002094.

* cited by examiner

FIG. 18
1801
202
Walking habit
is enhancing
1811
1812
Swinging your arms
naturally as you walk can
improve your balance
and prevent falls
620

METHOD FOR DETECTING FALL OF USER AND ELECTRONIC DEVICE SUPPORTING THE SAME

CROSS-REFERENCE TO RELATED APPLICATIONS

This application is a by-pass continuation application of International Application No. PCT/KR2024/002094, filed on Feb. 14, 2024, which is based on and claims priority to Korean Patent Application Nos. 10-2023-0038854, filed on Mar. 24, 2023, and 10-2023-0062476, filed on May 15, 2023, in the Korean Intellectual Property Office, the disclosures of which are incorporated by reference herein their entireties.

BACKGROUND

1. Field

The disclosure relates to a method for detecting a fall of a user and an electronic device supporting the same.

2. Description of Related Art

Recently, there has been a growing interest in walking assistance devices. Walking assistance devices (e.g., a wearable walking assistance robot, gait enhancing and motivating system (GEMS) HIP™) are worn by a user and can help the user walk efficiently and stably by enhancing the user's gait and motor function.

A user wearing a walking assistance device may have behavioral limitations, which may make the user vulnerable to a fall. The walking assistance device may detect whether a fall occurs to the user wearing the walking assistance device and, if so, provide the user with a fall-related notification (e.g., a warning).

The above-described information may be provided as related art for the purpose of helping understanding of the disclosure. No claim or determination is made as to whether any of the foregoing is applicable as background art in relation to the disclosure.

SUMMARY

A walking assistance device may detect whether a fall occurs to the user, based on a change in the user's altitude measured through an atmospheric pressure sensor and/or fall impact (and a change in the waist angle) measured through an inertial sensor.

The walking assistance device may more accurately detect the user's fall when the user is in a standing position. The amount of first fall impact, which is measured through the inertial sensor of the walking assistance device when the user falls unconsciously, such as fainting, in a sitting position, may be smaller than the amount of second fall impact, which is measured through the inertial sensor when the user falls from a standing position. Accordingly, if a fall occurs while the user is sitting, the walking assistance device may not accurately detect the user's fall.

A watch-type wearable electronic device (e.g., smartwatch) may detect whether a fall occurs to the user based on the fall impact measured through an inertial sensor, a change in the user's altitude measured through an atmospheric pressure sensor, and/or the user's biometric information (e.g., the user's heart rate). The watch-type wearable electronic device may more accurately detect the user's fall when the user is in a sitting position. When the user loses consciousness and falls in a standing position, there may be substantially no movement in the wrist wearing the watch-type wearable electronic device. Thus, the watch-type wearable electronic device may fail to accurately detect the user's fall if the user falls in the standing position.

The disclosure relates to a method for detecting a user's fall and an electronic device supporting the same, which may detect the user's fall by interworking between electronic devices (e.g., a walking assistance device and a watch-type wearable electronic device) based on the posture of the user wearing the electronic devices.

Embodiments of the disclosure are not limited to the foregoing, and other unmentioned objects would be apparent to one of ordinary skill in the art from the following description.

According to an aspect of the disclosure, an electronic device includes: a communication circuit; a first sensor; at least one processor; and memory storing instructions, wherein the instructions, when executed by the at least one processor, cause the electronic device to: determine whether a user wearing the electronic device is in a standing posture, through the first sensor; determine that the electronic device is a main electronic device and an external electronic device connected to the electronic device is a sub electronic device, based on determining that the user is in the standing posture; obtain first information related to a fall of the user through the first sensor; receive, from the external electronic device through the communication circuit, second information related to the fall of the user, wherein the second information is obtained by the external electronic device; and detect the fall of the user, by applying a first weight corresponding to the main electronic device to the first information and by applying a second weight corresponding to the sub electronic device to the second information, the second weight being lower than the first weight.

According to an aspect of the disclosure, a method performed by an electronic device for detecting a fall of a user, the method includes: determining, through a first sensor of the electronic device, whether the user wearing the electronic device is in a standing posture; determining that the electronic device is a main electronic device and an external electronic device connected to the electronic device is a slave electronic device, based on determining that the user is in the standing posture; obtaining, through the first sensor, first information related to the fall of the user; receiving, from the external electronic device through a communication circuit of the electronic device, second information related to the fall of the user, wherein the second information is obtained by the external electronic device; and detecting the fall of the user by applying a first weight corresponding to the main electronic device to the first information and by applying a second weight corresponding to the slave electronic device to the second information, the second weight being lower than the first weight.

According to an aspect of the disclosure, an electronic device includes: a communication circuit; a first sensor; at least one processor; and memory storing instructions, wherein the instructions, when executed by the at least one processor, cause the electronic device to: receive, from an external electronic device through the communication circuit, information about a posture of a user wearing both the electronic device and an external electronic device connected to the electronic device; based on the user being in a sitting posture, determine that the electronic device is a main electronic device and the external electronic device is a sub electronic device; receive, from the external electronic device through the communication circuit, first information related to a fall of the user, wherein the first information is obtained by the external electronic device; obtain, through the first sensor, second information related to the fall of the user; and detect the fall of the user by applying a first weight corresponding to the main electronic device to the second information and by applying a second weight corresponding to the slave electronic device to the first information, the second weight being lower than the first weight.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
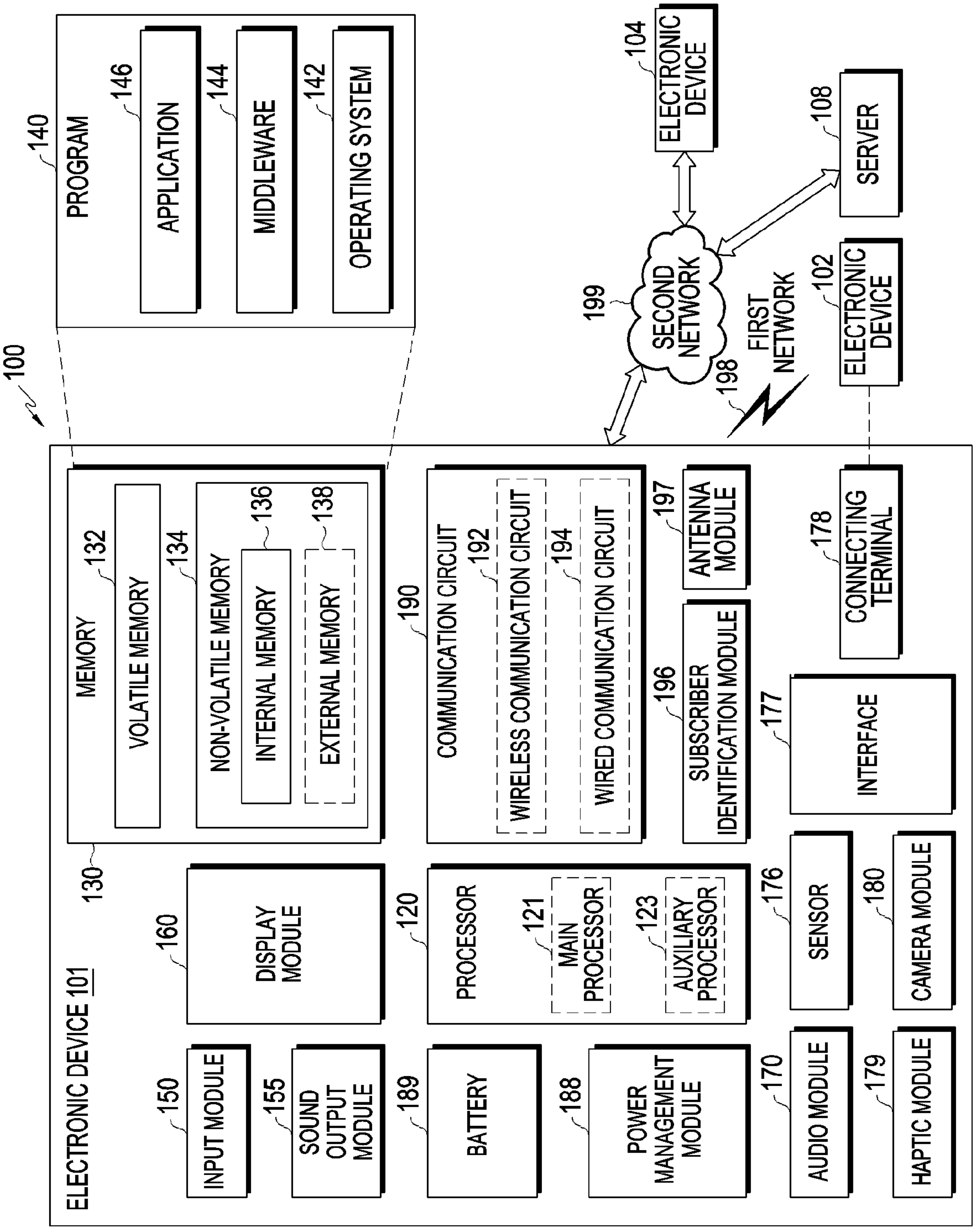
FIG. 1 is a block diagram illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor 176, an interface 177, a connecting terminal 178, a haptic module 179, a camera module 180, a power management module 188, a battery 189, a communication circuit 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor 176 or the communication circuit 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor 176, or the communication circuit 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication circuit 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication circuit 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication circuit 190 may include one or more communication processors that are operable independently from the processor 120 (e.g., the application processor (AP)) and supports a direct (e.g., wired) communication or a wireless communication. According to an embodiment, the communication circuit 190 may include a wireless communication circuit 192 (e.g., a cellular communication circuit, a short-range wireless communication circuit, or a global navigation satellite system (GNSS) communication circuit) or a wired communication circuit 194 (e.g., a local area network (LAN) communication circuit or a power line communication (PLC) module). A corresponding one of these communication circuits may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication circuits may be implemented as a single component (e.g., a single chip), or may be implemented as multi components (e.g., multi chips) separate from each other. The wireless communication circuit 192 may identify or authenticate the electronic device 101 in a communication network, such as the first network 198 or the second network 199, using subscriber information (e.g., international mobile subscriber identity (IMSI)) stored in the subscriber identification module 196.

The wireless communication circuit 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication circuit 192 may support a high-frequency band (e.g., the mmWave band) to achieve, e.g., a high data transmission rate. The wireless communication circuit 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication circuit 192 may support various requirements specified in the electronic device 101, an external electronic device (e.g., the electronic device 104), or a network system (e.g., the second network 199). According to an embodiment, the wireless communication circuit 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication circuit 190. The signal or the power may then be transmitted or received between the communication circuit 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
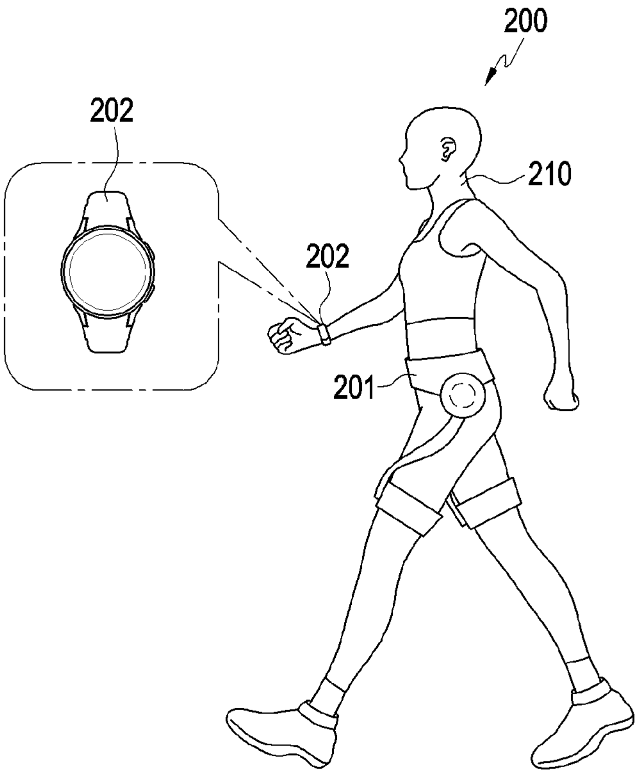
FIG. 2 is a view illustrating a first electronic device and a second electronic device according to an embodiment.

FIG. 2 is a view 200 illustrating a first electronic device 201 and a second electronic device 202 according to an embodiment.

Referring to FIG. 2, in an embodiment, the first electronic device 201 may be a walking assistance device (e.g., a wearable walking assistance robot). For example, the first electronic device 201 may be a walking assistance device worn on the body (e.g., the waist and/or thigh of the user 210) of the user 210 to enhance the gait and motor function of the user 210, thereby helping the user 210 to walk efficiently and stably. Components included in the first electronic device 201 are described in detail with reference to FIGS. 3, 4, and 5.

Figure 5:
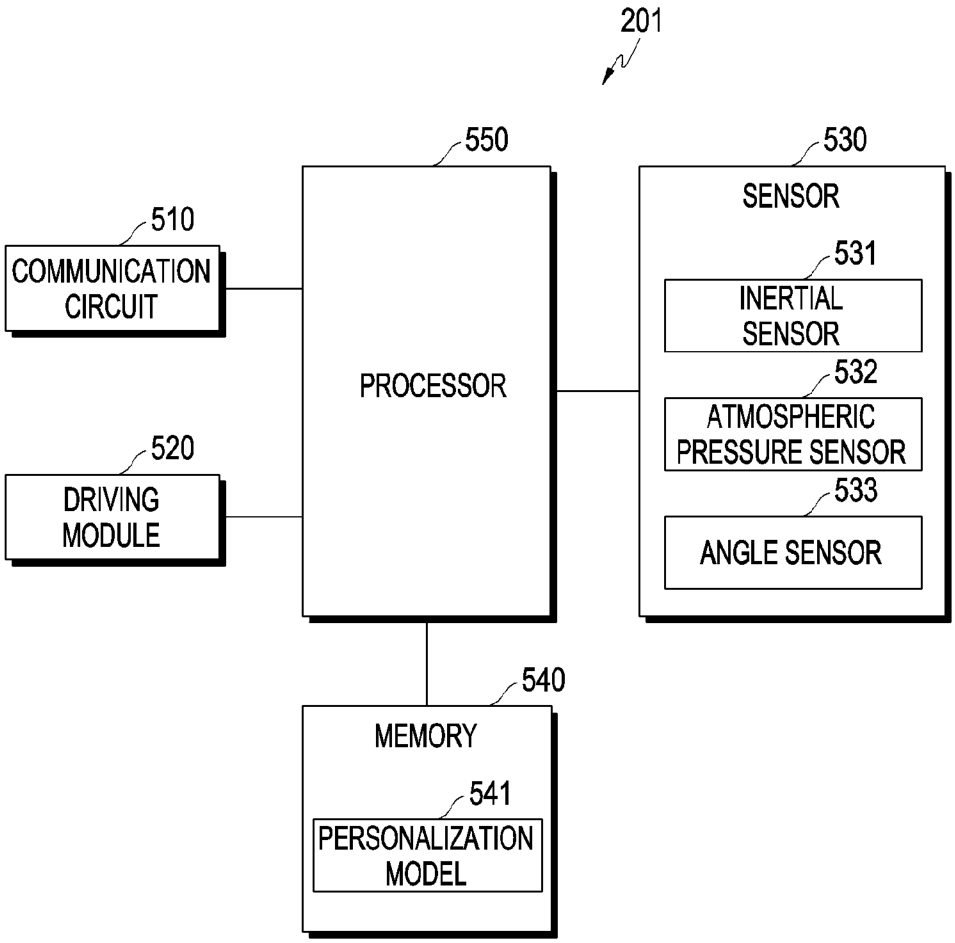
FIG. 5 is a block diagram illustrating a first electronic device according to an embodiment.

In an embodiment, the first electronic device 201 may detect a fall (e.g., a fall situation) of the user 210, based on sensor data obtained through a sensor (e.g., the inertial sensor 531 of FIG. 5). In an embodiment, the fall type of the user 210 may be divided into a hard fall accompanied by a relatively strong fall impact when the user 210 falls or slides on an obstacle while the user 210 is conscious, and a soft fall accompanied by a relatively weak impact when the user 210 lose consciousness and falls, such as fainting. In an embodiment, when the fall of the user 210 occurs, the first electronic device 201 may obtain sensor data as shown in Table 1 below through a sensor (e.g., the sensor 530 of FIG. 5) according to the posture of the user 210 (e.g., standing posture and sitting posture of the user 210) and the type of the fall.

TABLE 1

| | | Sensor type | |
|---|---|---|---|
| User's posture | Fall type | inertial sensor | atmospheric pressure sensor |
| standing posture (or walking state) | hard fall | strong impact | large change in altitude |
| | soft fall | strong impact | large altitude change |

TABLE 1-continued

| User's posture | Fall type | Sensor type: inertial sensor | Sensor type: atmospheric pressure sensor |
|---|---|---|---|
| sitting posture | hard fall | weak impact | small change in altitude |
| | soft fall | weak impact | small altitude change |

In an embodiment, in Table 1, when a hard fall or a soft fall occurs to the user 210 in the standing posture of the user 210 (e.g., the standing posture of the user 210 without walking or the state in which the user 210 is walking in the standing posture), the first electronic device 201 may detect a strong impact (e.g., a fall impact greater than or equal to a designated impact caused by a relatively large change in the position of the inertial sensor (or the moving speed of the inertial sensor)) through the inertial sensor, and detect a large change in altitude (e.g., an change in altitude that may affect determination of whether a fall of the user 210 occurs) through an atmospheric pressure sensor (e.g., the atmospheric pressure sensor 532 of FIG. 5). In an embodiment, when a hard fall or a soft fall occurs to the user 210 in the sitting posture of the user 210 (e.g., the sitting posture of the user 210 without walking), the first electronic device 201 may detect a weak impact (e.g., a fall impact less than the designated impact caused by a relatively small change in the position of the inertial sensor) through the inertial sensor, and detect a small change in altitude (e.g., an change in altitude that may rarely affect determination of whether a fall of the user 210 occurs) through the atmospheric pressure sensor.

In an embodiment, as the first electronic device 201 is worn on a part (e.g., the waist and/or leg) of the user's body, the movement of the part of the user's body may become unfree. Accordingly, when a fall occurs to the user, the fall may occur to the user in a form in which the user falls at an angle inclined with respect to the direction perpendicular to the ground. The inertial sensor and the atmospheric pressure sensor may obtain sensor data for the movement of the first electronic device 201 corresponding to the fall form of the user.

In an embodiment, as shown in Table 1, when a fall occurs while the user 210 is standing (or walking), the first electronic device 201 may more accurately detect the fall of the user 210 by detecting a strong impact through the inertial sensor and detecting a large change in altitude through the atmospheric pressure sensor. On the other hand, when a fall occurs while the user 210 is sitting, the first electronic device 201 may detect a weak impact through the inertial sensor and detect a small change in altitude through the atmospheric pressure sensor, so that it may be difficult to accurately detect the fall of the user 210.

In an embodiment, Table 1 illustrates that the first electronic device 201 detects the fall of the user 210, based on the impact obtained through the inertial sensor and the change in altitude obtained through the altitude sensor, but embodiments of the disclosure are not limited thereto. For example, the first electronic device 201 may detect the fall of the user 210 by further considering the change in the waist angle of the user 210 obtained through the inertial sensor, in addition to the impact obtained through the inertial sensor and the change in altitude obtained through the altitude sensor.

In an embodiment, the second electronic device 202 may be a watch-type wearable electronic device. For example, the second electronic device 202 may be a wearable electronic device wearable on the body (e.g., the wrist of the user 210) of the user 210 and capable of providing various functions. However, the second electronic device 202 is not limited to a watch-type wearable electronic device. For example, the second electronic device 202 may include various types of wearable electronic devices (e.g., a band type or a ring type) capable of detecting (or detecting) a fall of the user 210 while being worn on the body (e.g., a finger of the user 210) of the user 210.

Figure 6:
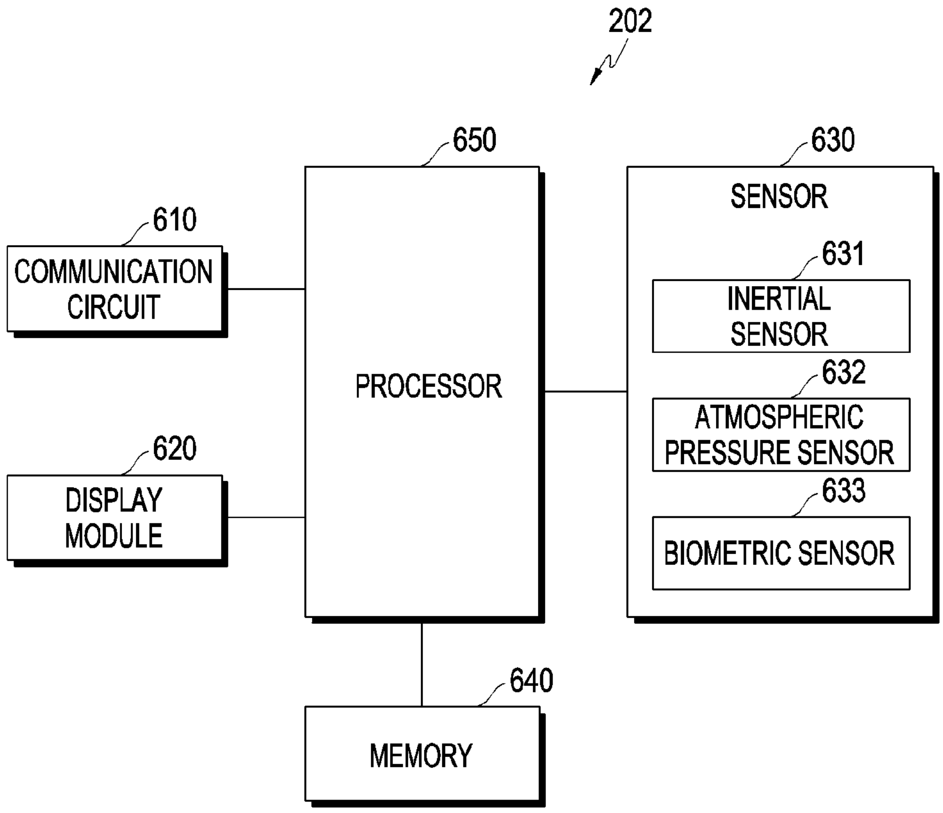
FIG. 6 is a block diagram illustrating a second electronic device according to an embodiment.

In an embodiment, the second electronic device 202 may detect a fall (e.g., a fall situation) of the user 210, based on sensor data obtained through a sensor (e.g., the sensor 630 of FIG. 6). In an embodiment, when the fall of the user 210 occurs, the second electronic device 202 may obtain sensor data as shown in Table 2 below through the sensor according to the posture of the user 210 (e.g., the standing posture of the user 210 and the sitting posture of the user 210) and the type of the fall.

TABLE 2

| User's posture | Fall type | Sensor type: inertial sensor | Sensor type: atmospheric pressure sensor |
|---|---|---|---|
| standing posture (or walking state) | hard fall | strong impact | large change in altitude |
| | soft fall | weak impact | large change in altitude |
| sitting posture | hard fall | strong impact | small change in altitude |
| | soft fall | weak impact | small change in altitude |

In an embodiment, in Table 2, when a hard fall occurs to the user 210 in the standing posture of the user 210 (e.g., the standing posture of the user 210 without walking or the state in which the user 210 is walking in the standing posture), the second electronic device 202 may detect a strong impact (e.g., a fall impact of a designated impact or more that is caused when the user 210 unconsciously stretches her hand while wearing the second electronic device 202) through the inertial sensor, and detect a large change in altitude (e.g., an change in altitude that may affect determination of whether a fall of the user 210 occurs) through an atmospheric pressure sensor (e.g., the atmospheric pressure sensor 632 of FIG. 6). In an embodiment, when a soft fall occurs to the user 210 in the standing posture of the user 210 (e.g., the standing posture of the user 210 without walking or a state in which the user 210 is walking in the standing posture), the second electronic device 201 may detect a weak impact (e.g., a fall impact less than the designated impact caused as the user 210's movement of unconsciously stretching her hand while wearing the second electronic device 202 on her wrist is not made) through the inertial sensor, and detect a large change in altitude through the atmospheric pressure sensor.

In an embodiment, when the user 210 is in the standing posture and a soft fall occurs to the user 210, it may be difficult for the second electronic device 202 to accurately detect the fall of the user 210 as a weak impact is detected through the inertial sensor.

In an embodiment, when a hard fall occurs to the user 210 in the sitting posture of the user 210 (e.g., the sitting posture of the user 210 without walking), the second electronic device 202 may detect a strong impact through the inertial sensor and may detect a small change in altitude through the atmospheric pressure sensor. In an embodiment, when a soft fall occurs to the user 210 in the sitting posture of the user 210, the second electronic device 202 may detect a weak impact through the inertial sensor and may detect a small change in altitude through the atmospheric pressure sensor. In an embodiment, based on biometric information (e.g., heart rate and/or heart rate pattern) detected through a biometric sensor (e.g., the biometric sensor 633 of FIG. 6), when a soft fall occurs to the user 210 in the sitting posture of the user 210, the second electronic device 202 may more accurately detect the fall of the user 210. For example, when a soft fall occurs to the user 210 in the sitting posture of the user 210, a direct impact on the chest portion may be more likely as the upper body of the user 210 first hits the ground. When a direct impact occurs on the chest portion, the second electronic device 202 may analyze the biometric information about the user 210 through the biometric sensor, thereby more accurately detecting a fall of the user 210 when a soft fall occurs on the user 210 in a sitting posture of the user 210.

As described above, in an embodiment, when a fall occurs, the first electronic device 201 and the second electronic device 202 may detect the fall of the user 210 using at least some other sensors. Further, when a fall occurs, even if the first electronic device 201 and the second electronic device 202 use substantially the same sensor (e.g., an inertial sensor), the sensor data detected by the substantially same sensor may detect another movement of the user 210. For example, the inertial sensor of the first electronic device 201 may be positioned adjacent to the waist portion of the user 210 in the first electronic device 201 to detect sensor data related to a change in the position of the waist portion of the user 210, and the inertial sensor of the second electronic device 202 may detect sensor data related to the movement of the hand of the user 210 as the second electronic device 202 is worn on the wrist of the user 210.

Further, as described above, when the user 210 is in the standing posture (or a walking state), the first electronic device 201 may more accurately detect a fall of the user 210 than the second electronic device 202. When the user 210 is in the sitting posture, the second electronic device 202 may more accurately detect a fall of the user 210 than the first electronic device 201.

In an embodiment, the first electronic device 201 and the second electronic device 202 may interwork to detect a fall of the user 210, thereby more accurately detecting the fall of the user 210 using more various sensor data. Further, the first electronic device 201 and the second electronic device 202 may more accurately detect the fall of the user 210 by performing an operation of detecting the fall of the user 210 based on the posture of the user 210. An operation in which the first electronic device 201 and the second electronic device 202 interwork to detect a fall of the user 210 based on the posture of the user 210 wearing the first electronic device 201 and the second electronic device 202 is described below in detail with reference to the drawings.

Figure 3:
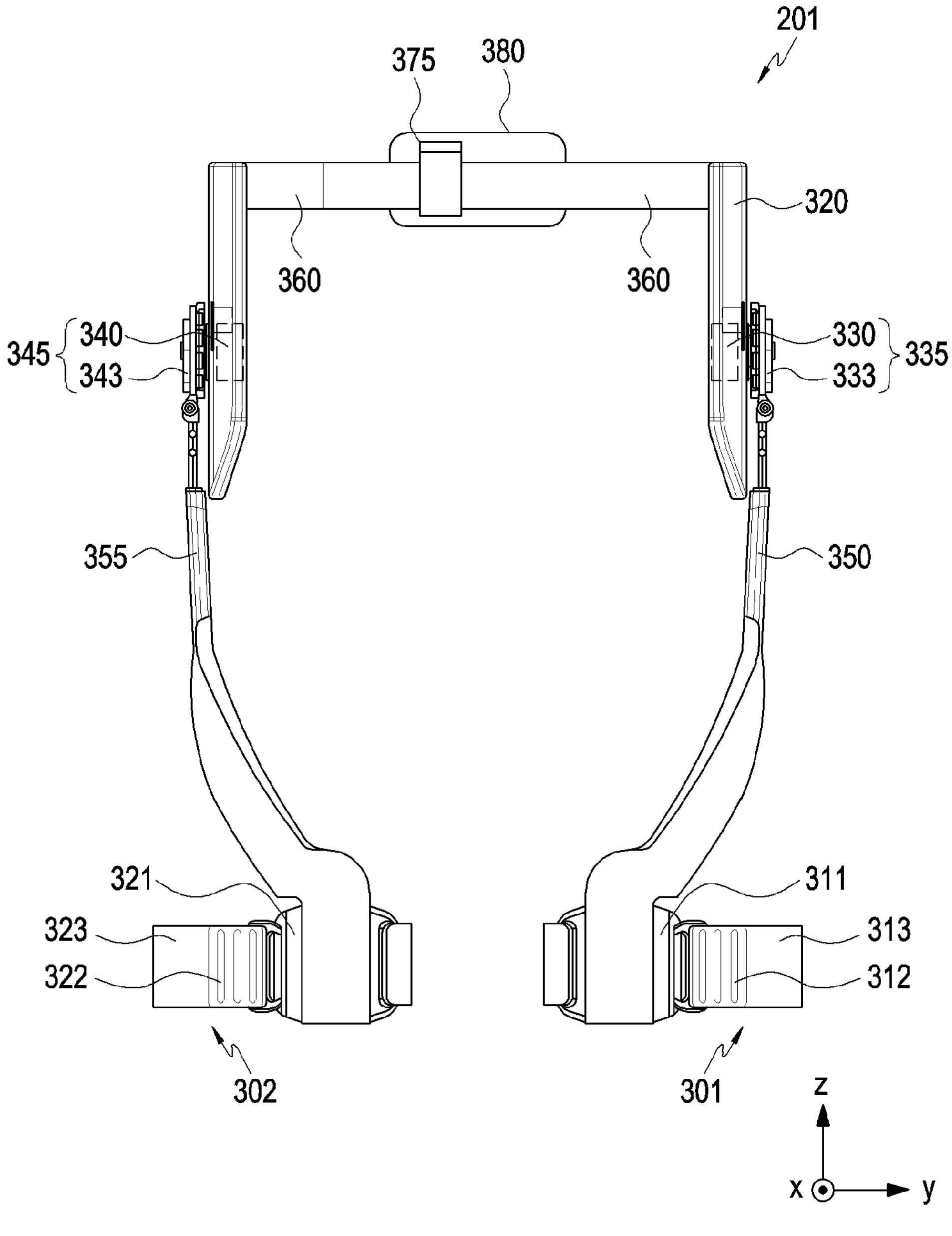
FIG. 3 is a front view illustrating a first electronic device according to an embodiment.

FIG. 3 is a front view illustrating a first electronic device 201 according to an embodiment.

Figure 4:
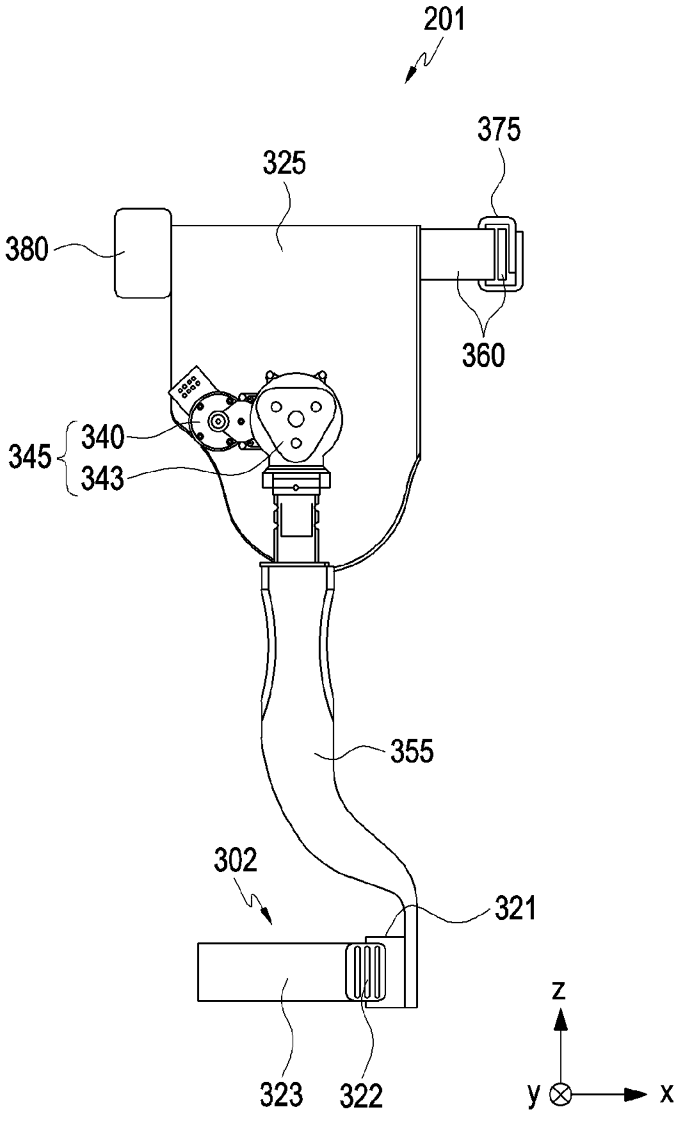
FIG. 4 is a side view illustrating a first electronic device according to an embodiment.

FIG. 4 is a side view illustrating a first electronic device 201 according to an embodiment.

Referring to FIGS. 3 and 4, in an embodiment, a first electronic device 201 worn on a body of a user (e.g., the user 210 of FIG. 2) may include a housing 380, waist supporting frames 320 and 325, driving modules 335 (e.g., drivers) and 345, leg supporting frames 350 and 355, thigh fasteners 301 and 302, and a waist fastener. The waist fastener may include a belt 360 and an auxiliary belt 375. In an embodiment, at least one (e.g., the auxiliary belt 375) of these components may be omitted from the first electronic device 201, or one or more other components may be added to the first electronic device 201.

In an embodiment, a control module (e.g., the processor 550 of FIG. 5), an inertial measurement device (e.g., the inertial sensor 531 of FIG. 5), a communication circuit (e.g., the communication circuit 510 of FIG. 5), and a battery may be disposed inside the housing 380. The housing 380 may protect the control module, the inertial measuring device, the communication circuit, and the battery. The housing 380 may be disposed, e.g., on the back or lower back of the user in the state in which the first electronic device 201 is worn on the user's body. The control module may generate a control signal for controlling the operation of the first electronic device 201. The control module may include a control circuit including memory and a processor for controlling the actuators 330 and 340 of the driving modules 335 and 345. In an embodiment, the control module may further include a power supply module for supplying power of the battery to each component of the first electronic device 201.

In an embodiment, the first electronic device 201 may include a sensor (e.g., the sensor 530 of FIG. 5) that obtains sensor data from one or more sensors. The sensor may obtain sensor data that changes according to the movement of the user. In an embodiment, the sensor may obtain sensor data including movement information about the user and/or movement information about a component of the first electronic device 201. The sensor may include, e.g., an inertial measurement device for measuring the upper body motion value of the user or the motion value of the waist supporting frames 320 and 325, and an angle sensor for measuring the hip joint angle value of the user or the motion value of the leg supporting frames 350 and 355, but embodiments of the disclosure are not limited thereto. For example, the sensor may further include at least one of a position sensor, a temperature sensor, a biometric signal sensor, or a proximity sensor.

In an embodiment, the waist supporting frames 320 and 325 may support a part of the user's body when the first electronic device 201 is worn on the user's body. The waist supporting frames 320 and 325 may contact at least a portion of an outer surface of the user. The waist supporting frames 320 and 325 may be curved in a shape corresponding to the contact portion of the user's body. The waist supporting frames 320 and 325 may surround, e.g., an outer surface of the waist (or pelvis) of the user, and may support the waist or pelvis of the user. The waist supporting frames 320 and 325 may include a first waist supporting frame 325 supporting a right side of the waist of the user and a second waist supporting frame 320 supporting a left side of the waist of the user. The waist supporting frames 320 and 325 may be connected to the housing 380.

The waist fastener may be connected to the waist supporting frames 320 and 325, and may fix the waist supporting frames 320 and 325 to the waist of the user. The waist fastener may include, e.g., a pair of belts 360 and an auxiliary belt 375.

In an embodiment, the pair of belts 360 may be connected to the waist supporting frames 320 and 325. The pair of belts 360 may maintain a shape extending forward (+x direction) in a state before the user wears the first electronic device 201, and may not prevent the user from entering the pair of waist supporting frames 320 and 325. When the user enters the inside of the pair of waist supporting frames 320 and 325, the pair of belts 360 may be deformed to surround the front portion of the user. The waist supporting frames 320 and 325 and the pair of belts 360 may entirely surround the waist of the user. In an embodiment, the auxiliary belt 375 may fix the pair of belts 360 to each other while the pair of belts 360 overlap each other. For example, any one of the pair of belts 360 may surround the other belt together with the auxiliary belt 375.

The driving modules 335 and 345 (e.g., drivers) may generate an external force (or torque) applied to the user's body based on a control signal generated by the control module. The driving modules 335 and 345 may generate an external force applied to the user's leg under the control of the control module. In an embodiment, the driving modules 335 and 345 may include a first driving module 345 positioned at a position corresponding to the position of the right hip joint of the user and a second driving module 335 positioned at a position corresponding to the position of the left hip joint of the user. The first driving module 345 may include a first actuator 340 and a first joint member 343, and the second driving module 335 may include a second actuator 330 and a second joint member 333. The first actuator 340 may provide power transferred to the first joint member 343, and the second actuator 330 may provide power transferred to the second joint member 333. Each of the first actuator 340 and the second actuator 330 may include a motor that receives power from a battery and generates power (or torque). When the motor is powered and driven, the motor may provide a force (e.g., an assistant force) for assisting the user's body movement or a force (e.g., a resistance force) for obstructing the user's body movement. In an embodiment, the control module may adjust the intensity of the force generated by the motor and the direction of the force by adjusting the voltage and/or current supplied to the motor.

In an embodiment, the first joint member 343 and the second joint member 333 may receive power from the first actuator 340 and the second actuator 330, respectively, and may apply an external force to the user's body based on the received power. Each of the first joint member 343 and the second joint member 333 may be disposed at a position corresponding to a joint portion of the user. The first joint member 343 and the second joint member 333 may be disposed on sides of the waist supporting frames 325 and 320, respectively. One side of the first joint member 343 may be connected to the first actuator 340, and the other side of the first joint member 343 may be connected to the first leg supporting frame 355. The first joint member 343 may be rotated by the power received from the first actuator 340. An encoder or a hall sensor capable of operating as an angle sensor for measuring a rotation angle (corresponding to the user's joint angle) of the first joint member 343 may be disposed on one side of the first joint member 343. One side of the second joint member 333 may be connected to the second actuator 330, and the other side of the second joint member 333 may be connected to the second leg supporting frame 350. The second joint member 333 may be rotated by the power received from the second actuator 330. An encoder or a hall sensor capable of operating as an angle sensor for measuring the rotation angle of the second joint member 333 may also be disposed on one side of the second joint member 333.

In an embodiment, the first actuator 340 may be disposed in a lateral direction of the first joint member 343, and the second actuator 330 may be disposed in a lateral direction of the second joint member 333. The rotation axis of the first actuator 340 and the rotation axis of the first joint member 343 may be disposed to be spaced apart from each other, and the rotation axis of the second actuator 330 and the rotation axis of the second joint member 333 may also be disposed to be spaced apart from each other. However, embodiments of the disclosure are not limited thereto, and the actuators 330 and 340 and the joint members 333 and 343 may share a rotation axis. In an embodiment, the actuators 330 and 340 may be disposed to be spaced apart from the joint members 333 and 343, respectively. In this case, the driving modules 335 and 345 may further include a power transmission module for transferring power from the actuators 330 and 340 to the joint members 333 and 343. The power transmission module may be a rotating body such as a gear, or a longitudinal member such as a wire, a cable, a string, a spring, a belt, or a chain. However, the scope of the embodiments is not limited by the positional relationship and the power transmission structure between the actuators 330 and 340 and the joint members 333 and 343 described above.

In an embodiment, the leg supporting frames 350 and 355 may support the leg (e.g., thigh) of the user when the first electronic device 201 is worn on the leg of the user. The leg supporting frames 350 and 355 may transmit, e.g., the power generated by the driving modules 335 and 345 to the thigh of the user, and the corresponding power may act as an external force applied to the leg movement of the user. First ends of the leg supporting frames 350 and 355 may be connected to the joint members 333 and 343 and rotated, and second ends of the leg supporting frames 350 and 355 may be connected to the covers 311 and 321 of the thigh fasteners 301 and 302, so that the leg supporting frames 350 and 355 may transfer the power generated by the driving modules 335 and 345 to the thighs of the user while supporting the thighs of the user. For example, the leg supporting frames 350 and 355 may push or pull the thighs of the user. The leg supporting frames 350 and 355 may extend along the longitudinal direction of the thighs of the user. The leg supporting frames 350 and 355 may be bent to surround at least a portion of the circumference of the thighs of the user. For example, upper portions of the leg supporting frames 350 and 355 may cover a portion of the user's body that faces in a lateral direction (e.g., +y direction or −y direction), and lower portions of the leg supporting frames 350 and 355 may cover a portion of the user's body that faces in a front direction (e.g., +x direction). The leg supporting frames 350 and 355 may include a first leg supporting frame 355 for supporting the right leg of the user and a second leg supporting frame 350 for supporting the left leg of the user.

The thigh fasteners 301 and 302 may be connected to the leg supporting frames 350 and 355, and may fix the leg supporting frames 350 and 355 to the thighs. The thigh fasteners 301 and 302 may include a first thigh fastener 302 for fixing the first leg supporting frame 355 to the right thigh of the user and a second thigh fastener 301 for fixing the second leg supporting frame 350 to the left thigh of the user. The first thigh fastener 302 may include a first cover 321, a first fastening frame 322, and a first strap 323, and the second thigh fastener 301 may include a second cover 311, a second fastening frame 312, and a second strap 313.

In an embodiment, the covers 311 and 321 may apply torque generated by the driving modules 335 and 345 to the thighs of the user. The covers 311 and 321 may be disposed on one side of the thigh of the user to push or pull the thigh of the user. The covers 311 and 321 may be disposed, e.g., on the front surface (e.g., in the +x direction) of the thigh of the user. The covers 311 and 321 may be disposed along the circumferential direction of the thigh of the user. The covers 311 and 321 may extend to two opposite sides of the other end portions of the leg supporting frames 350 and 355, and may include a curved surface corresponding to the thigh of the user. First ends of the covers 311 and 321 may be connected to the fastening frames 312 and 322, and second ends of the covers 311 and 321 may be connected to the straps 313 and 323.

In an embodiment, first ends of the fastening frames 312 and 322 may be connected to first sides of the covers 311 and 321, and second ends of the fastening frames 312 and 322 may be connected to the straps 313 and 323. The fastening frames 312 and 322 may be disposed to surround, e.g., at least a portion of the thigh of the user to prevent the thigh of the user from falling off the leg supporting frames 350 and 355. The first fastening frame 322 may have a fastening structure connecting the first cover 321 and the first strap 323, and the second fastening frame 312 may have a fastening structure connecting the second cover 311 and the second strap 313.

The straps 313 and 323 may surround the remaining portions of the thighs of the user that are not surrounded by the covers 311 and 321 and the fastening frames 312 and 322, and may include an elastic material (e.g., a band).

In an embodiment, the first electronic device 201 may support each of the proximal portion and the distal portion of the user, assisting relative movement between the proximal portion and the distal portion. Among the components of the first electronic device 201, the components worn on the proximal portion of the user may be referred to as "proximal wearing portions", and the components worn on the distal portion may be referred to as "distal wearing portions". For example, among the components of the first electronic device 201, the housing 380, the waist supporting frames 320 and 325, the pair of belts 360, and the auxiliary belt 370 may correspond to proximal wearing portions, and the thigh fasteners 301 and 302 may correspond to distal wearing portions. For example, the proximal wearing portion may be worn on the waist or pelvis of the user, and the distal wearing portion may be worn on the thigh or calf of the user. The position where the proximal wearing portion and the distal wearing portion are worn is not limited thereto. For example, the proximal wearing portion may be worn on the torso or shoulder of the user, and the distal wearing portion may be worn on an upper arm or a lower arm of the user.

FIG. 5 is a block diagram illustrating a first electronic device 201 according to an embodiment.

Referring to FIG. 5, in an embodiment, the first electronic device 201 may be the electronic device 101 of FIG. 1 or the first electronic device 201 of FIGS. 2, 3, and 4.

In an embodiment, the first electronic device 201 may include a communication circuit 510, a driving module 520 (e.g., driver), a sensor 530, a memory 540, and/or a processor 550. Throughout the disclosure, the processor 550 is at least one processor (a single processor or a combination of two or more processors), which includes or corresponds to circuitry like a central processing unit (CPU), a microprocessor unit (MPU), an application processor (AP), a coprocessor (CP), a system-on-chip (SoC), or an integrated circuit (IC).

In an embodiment, the communication circuit 510 may be the communication circuit 190 of FIG. 1.

In an embodiment, the communication circuit 510 may support communication between the first electronic device 201 and the external electronic device. For example, the communication circuit 510 (e.g., the Bluetooth™ communication circuit 510) may support communication between the first electronic device 201 and the second electronic device 202. However, embodiments of the disclosure are not limited thereto, and the communication circuit 510 may support communication with a third electronic device (e.g., a smartphone) and/or a fourth electronic device (e.g., the server 108 of FIG. 1) in addition to the second electronic device 202.

In an embodiment, the driving module 520 may be the driving modules 335 and 345 of FIGS. 3 and 4. For example, the driving module 520 may generate an external force (or torque) applied to the user's body based on a control signal generated by the processor 550.

In an embodiment, the sensor 530 may be the sensor 176 of FIG. 1.

In an embodiment, the sensor 530 may include an inertial sensor 531, an atmospheric pressure sensor 532, and/or an angle sensor 533.

In an embodiment, the inertial sensor 531 (also referred to as an "inertia measurement unit (EIU) sensor") (e.g., the inertial measurement device described with reference to FIGS. 3 and 4) may obtain (e.g., generate) sensor data related to the movement of the first electronic device 201 (e.g., the magnitude of the movement of the first electronic device 201 and/or the direction in which the first electronic device 201 faces).

In an embodiment, the inertial sensor 531 may provide sensor data to the processor 550 so that the first electronic device 201 obtains the amount of impact caused by the fall of the user, the waist posture of the user wearing the first electronic device 201, the amount of change in the waist angle of the user, and/or the waling balance (gait balance or step balance) (hereinafter, also referred to as "walking balance") of the user.

In an embodiment, the inertial sensor 531 may include an acceleration sensor and/or a gyro sensor. However, the sensor included in the inertial sensor 531 is not limited to the above-described acceleration sensor and/or gyro sensor.

In an embodiment, the atmospheric pressure sensor 532 may obtain (e.g., measure) the pressure of air (e.g., the amount of change in the pressure of air). For example, the atmospheric pressure sensor 532 may obtain (e.g., generate) sensor data related to the pressure of air.

In an embodiment, the atmospheric pressure sensor 532 may provide sensor data to the processor 550 so that the first electronic device 201 obtains a change in the altitude of the user wearing the first electronic device 201 and/or a walking environment in which the user is walking (hereinafter, referred to as a "walking environment") (e.g., whether the ground on which the user is walking is flat or slopes).

In an embodiment, the angle sensor 533 may obtain (e.g., measure) the hip joint angle of the user wearing the first electronic device 201. For example, the angle sensor 533 may obtain (e.g., generate) sensor data related to the angle (hereinafter, referred to as the "hip joint angle") formed by the upper body (e.g., the waist of the user) of the user and the thigh of the user.

In an embodiment, the angle sensor 533 may provide sensor data to the processor 550 so that the first electronic device 201 obtains the hip joint angle of the user wearing the first electronic device 201, the posture of the user, and/or the walking balance.

Although FIG. 5 illustrates that the sensor 530 includes an inertial sensor 531, an atmospheric pressure sensor 532, and an angle sensor 533, embodiments of the disclosure are not limited thereto. For example, the sensor 530 may further include at least one of sensors included in the sensor 176 of FIG. 1. For example, the sensor 530 may not include some (e.g., the atmospheric pressure sensor 532) of the inertial sensor 531, the atmospheric pressure sensor 532, and the angle sensor 533.

In an embodiment, the memory 540 may be the memory 130 of FIG. 1.

In an embodiment, the memory 540 may store information necessary to perform the operation of detecting the user's fall. The information necessary to perform the operation of detecting the user's fall, stored in the memory 540, is described below.

In an embodiment, the memory 540 may include a personalization model 541. In an embodiment, the personalization model 541 may be a model for setting a period (or time) in which the first electronic device 201 (or the second electronic device 202) provides a fall warning notification. A method for obtaining (e.g., updating) the personalization model 541 is described below in detail with reference to FIGS. 14 and 15.

In an embodiment, the processor 550 may be the processor 120 of FIG. 1 or the control module described with reference to FIGS. 3 and 4.

In an embodiment, the processor 550 may control an overall operation of detecting a fall of the user. The processor 550 may include one or more processors for performing the operation of detecting the user's fall. The operation of detecting the user's fall performed by the processor 550 is described below in detail.

Although FIG. 5 illustrates that the first electronic device 201 includes the communication circuit 510, the driving module 520, the sensor 530, the memory 540, and the processor 550, embodiments of the disclosure are not limited thereto. For example, the first electronic device 201 may further include at least one component (e.g., the display module 160) among the components included in the electronic device 101 of FIG. 1, or one or more components among the components included in the first electronic device 201 of FIGS. 2, 3, and 4.

FIG. 6 is a block diagram illustrating a second electronic device 202 according to an embodiment.

Referring to FIG. 6, in an embodiment, the second electronic device 202 may be the electronic device 101 of FIG. 1 and/or the second electronic device 202 of FIG. 2.

In an embodiment, the second electronic device 202 may include a communication circuit 610, a display module 620, a sensor 630, a memory 640, and/or a processor 650.

In an embodiment, the communication circuit 610 may be the communication circuit 190 of FIG. 1.

In an embodiment, the communication circuit 610 may support communication between the second electronic device 202 and the external electronic device. For example, the communication circuit 610 (e.g., the Bluetooth™ communication circuit 610) may support communication between the second electronic device 202 and the first electronic device 201. However, embodiments of the disclosure are not limited thereto, and the communication circuit 610 may support communication with a third electronic device (e.g., a smartphone) and/or a fourth electronic device (e.g., the server 108 of FIG. 1) in addition to the first electronic device 201.

In an embodiment, the display module 620 may be the display module 160 of FIG. 1.

In an embodiment, the display module 620 may display information related to a fall. For example, when a fall of the user occurs, the display module 620 may display a notification indicating that the fall of the user is detected. For example, the display module 620 may display a fall warning notification indicating a situation in which the user's fall is likely. For example, the display module 620 may display information related to the user's walking habit. However, the information displayed by the display module 620 is not limited to the above-described examples.

In an embodiment, the sensor 630 may be the sensor 176 of FIG. 1.

In an embodiment, the sensor 630 may include an inertial sensor 631, an atmospheric pressure sensor 632, and/or a biometric sensor 633.

In an embodiment, the inertial sensor 631 may obtain (e.g., generate) sensor data related to the movement of the second electronic device 202 (e.g., the magnitude of the movement of the second electronic device 202 and/or the direction in which the second electronic device 202 faces) generated by the movement of the user's hand wearing the second electronic device 202.

In an embodiment, the inertial sensor 631 may provide sensor data to the processor 650 so that the second electronic device 202 obtains the amount of impact caused by the fall and/or the walking balance of the user.

In an embodiment, the inertial sensor 631 may include an acceleration sensor and/or a gyro sensor.

In an embodiment, the atmospheric pressure sensor 632 may obtain (e.g., measure) the pressure of air (e.g., the amount of change in the pressure of air). For example, the atmospheric pressure sensor 632 may obtain (e.g., generate) sensor data related to the pressure of air.

In an embodiment, the atmospheric pressure sensor 632 may provide sensor data to the processor 650 so that the second electronic device 202 obtains the change in altitude and/or the walking environment of the user wearing the second electronic device 202.

In an embodiment, the biometric sensor 633 may obtain (e.g., measure) a biometric signal of the user. For example, the biometric sensor 633 may obtain (e.g., generate) sensor data indicating the user's biometric signal.

In an embodiment, the biometric sensor 633 (e.g., a photoplethysmogram (PPG) sensor and/or an electrocardiogram (ECG) sensor) may provide sensor data to the processor 650 so that the second electronic device 202 obtains the user's heart rate (e.g., heart rate, heart rate change amount, oxygen saturation) when the user falls.

Although FIG. 6 illustrates that the sensor 630 includes an inertial sensor 631, an atmospheric pressure sensor 632, and a biometric sensor 633, embodiments of the disclosure are not limited thereto. For example, the sensor 630 may further include at least one of sensors included in the sensor 176 of FIG. 1. For example, the sensor 630 may not include some (e.g., the atmospheric pressure sensor 632) of the inertial sensor 631, the atmospheric pressure sensor 632, and the biometric sensor 633.

In an embodiment, the memory 640 may be the memory 130 of FIG. 1.

In an embodiment, the memory 640 may store information necessary to perform the operation of detecting the user's fall. The information necessary to perform the operation of detecting the user's fall, stored in the memory 640, is described below.

In an embodiment, the memory 640 may include a personalization model that is the same as or similar to the personalization model 541 of FIG. 5.

In an embodiment, the processor 650 may be the processor 120 of FIG. 1.

In an embodiment, the processor 650 may control an overall operation of detecting a user's fall. The processor 650 may include one or more processors for performing the operation of detecting the user's fall. The operation of detecting the user's fall performed by the processor 650 is described below in detail.

Although FIG. 6 illustrates that the second electronic device 202 includes the communication circuit 610, the display module 620, the sensor 630, the memory 640, and the processor 650, embodiments of the disclosure are not limited thereto. For example, the second electronic device 202 may further include at least one of the components included in the electronic device 101 of FIG. 1. For example, the second electronic device 202 may further include a housing and a wearing member connected to at least a portion of the housing and configured to detachably attach the second electronic device 202 to a body portion (e.g., a wrist or an ankle) of the user.

Figure 7:
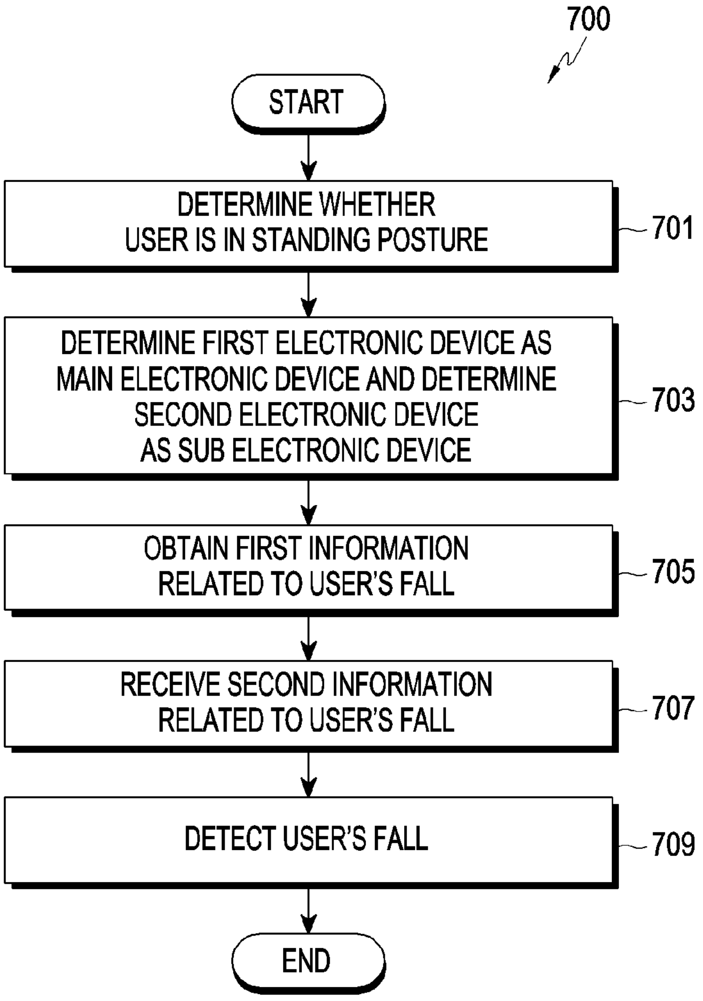
FIG. 7 is a flowchart illustrating a method for detecting a user's fall according to an embodiment.

FIG. 7 is a flowchart 700 illustrating a method for detecting a fall of a user, according to an embodiment.

In the following embodiment, the operations may be sequentially performed, but may be performed non-sequentially. For example, the order of the operations may be changed, and at least two operations may be performed in parallel.

Referring to FIG. 7, at operation 701, in an embodiment, a processor (e.g., processor 550 of FIG. 5) may determine whether the user wearing the first electronic device 201 is in the standing posture through the sensor 530. For example, the processor 550 may determine whether the posture of the user wearing the first electronic device 201 (and the second electronic device 202) (hereinafter, also referred to as a "user") is the standing posture or the sitting posture, based on sensor data obtained through the sensor 530. Hereinafter, an operation of determining the posture of the user is described with reference to FIG. 8.

Figure 8:
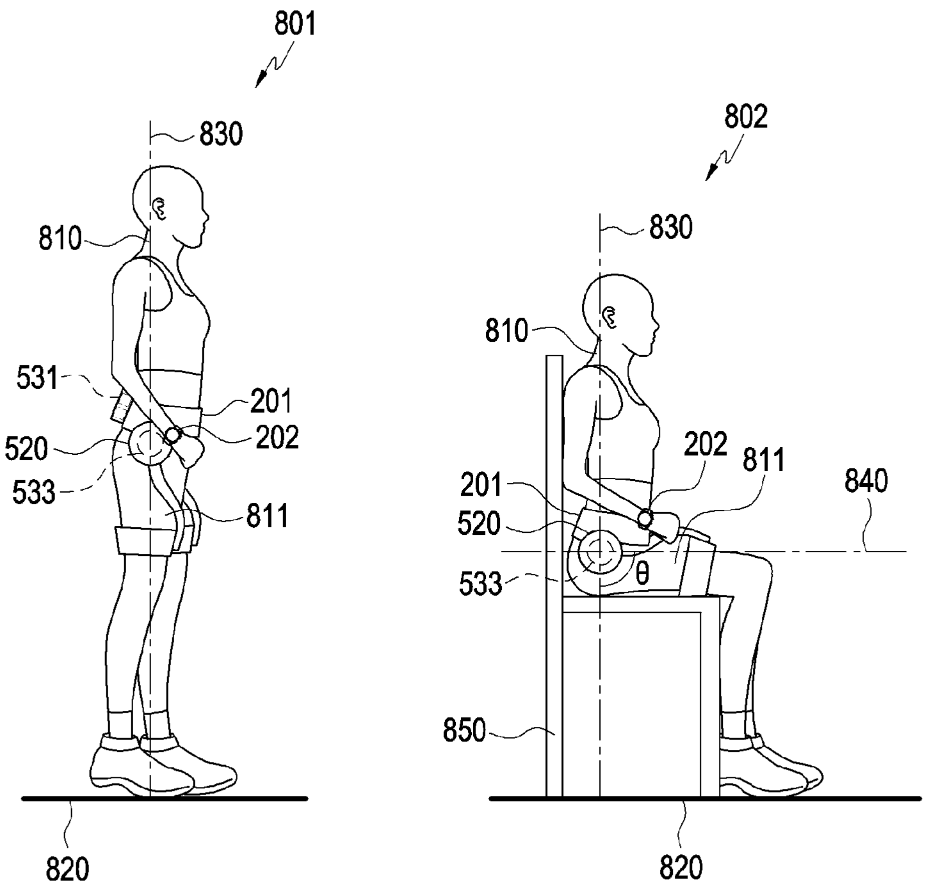
FIG. 8 is a view illustrating an operation for determining a user's posture according to an embodiment.

FIG. 8 is a view illustrating a method for determining a user's posture according to an embodiment.

Referring to FIG. 8, in an embodiment, reference numeral 801 of FIG. 8 may indicate a case where the posture of the user 810 is a standing posture, and reference numeral 802 of FIG. 8 may indicate a case where the posture of the user 810 is a sitting posture (e.g., a case where the user 810 is sitting on a chair 850).

In an embodiment, the processor (e.g., the processor 550 of FIG. 5) may obtain sensor data through the inertial sensor 531 and the angle sensor 533.

In an embodiment, the processor 550 may obtain a waist (or upper body) posture (e.g., information about the waist posture of the user) of the user, based on sensor data obtained through the inertial sensor 531. For example, the processor 550 may identify whether the direction (e.g., the line 830) in which the waist of the user faces is substantially the same as the direction perpendicular to the ground 820, based on the sensor data obtained through the inertial sensor 531. For example, the processor 550 may identify whether an angle (hereinafter, also referred to as the "waist angle") formed by the direction in which the waist of the user faces and the direction perpendicular to the ground 820 is less than or equal to a threshold angle, based on sensor data obtained through the inertial sensor 531. Based on identifying that the angle formed by the direction in which the waist of the user faces and the direction perpendicular to the ground 820 is equal to or smaller than the threshold angle, the processor 550 may determine that the direction in which the waist of the user faces and the direction perpendicular to the ground 820 are substantially the same. Based on identifying that the angle formed by the direction in which the waist of the user faces and the direction perpendicular to the ground 820 exceeds the threshold angle, the processor 550 may determine that the direction in which the waist of the user faces and the direction perpendicular to the ground 820 are not substantially the same.

In an embodiment, the processor 550 may obtain a hip joint angle (hereinafter, also referred to as a "hip joint angle") of the user, based on sensor data obtained through the angle sensor 533. In an embodiment, the hip joint angle may be an angle formed by the waist (or upper body) of the user and the thigh 811 of the user. For example, the hip joint angle θ may be an angle formed by the direction (e.g., the line 830) in which the waist of the user faces and the direction (e.g., the line 840) in which the thigh 811 of the user faces.

In an embodiment, the processor 550 may determine the posture of the user as the standing posture, based on identifying that the direction (e.g., the line 830) in which the waist of the user faces is substantially the same as the direction perpendicular to the ground 820 and that the hip joint angle is within a designated angle range (e.g., a designated angle range with respect to 0 degrees (°)).

In an embodiment, the processor 550 may determine the posture of the user as the sitting posture, based on identifying that the direction (e.g., the line 830) in which the waist of the user faces is substantially the same as the direction perpendicular to the ground 820 and that the hip joint angle is within a designated angle range (e.g., a designated angle range with respect to 90 degrees (°)).

In an embodiment, when the direction (e.g., the line 830) in which the waist of the user faces is not substantially the same as the direction perpendicular to the ground 820, the processor 550 may determine that the posture of the user is not the standing posture or the sitting posture. For example, when the user is lying down (e.g., when the direction in which the waist of the user is facing (e.g., the line 830) is substantially parallel to the ground 820), the processor 550 may determine that the posture of the user is not the standing posture or the sitting posture. Based on determining that the user's posture is not the standing posture or the sitting posture, the processor 550 may repeat obtaining sensor data through the inertial sensor 531 and the angle sensor 533.

In an embodiment, the processor 550 may determine whether the user is walking, based on sensor data obtained through the sensor 530 (e.g., the inertial sensor 531). For example, the processor 550 may obtain the swing period of the foot of the user and/or the period during which the foot of the user is in contact with the ground, based on sensor data obtained through the inertial sensor 531. The processor 550 may determine whether the user is walking (e.g., whether the user is walking in the standing posture), based on the swing period of the foot of the user and/or the period during which the foot of the user is in contact with the ground. For example, the processor 550 may obtain the gait pattern of the user based on the sensor data obtained through the inertial sensor 531. The processor 550 may determine whether the user is walking based on the obtained gait pattern. For example, the processor 550 may obtain the periodic movement of the leg (e.g., the angle of the leg joint) of the user based on the sensor data obtained through the angle sensor 533. The processor 550 may determine whether the user is walking based on the obtained periodic movement of the legs of the user.

Referring to FIG. 7, the first electronic device 201 may be worn by the user together with the second electronic device 202 and may be wirelessly connected to the second electronic device 202 through the communication circuit 510 (e.g., the Bluetooth™ communication circuit 510).

In operation 703, in an embodiment, the processor 550 may determine the first electronic device 201 as a main electronic device (also referred to as a "master electronic device") and may determine the second electronic device 202 as a sub electronic device (also referred to as a "slave electronic device"), based on determining that the user's posture is the standing posture.

In an embodiment, based on determining that the posture of the user is the sitting posture, the processor 550 may determine (e.g., set) the second electronic device 202 as the main electronic device and may determine the first electronic device 201 as the sub electronic device.

In an embodiment, based on determining that the user is walking, the processor 550 may determine (e.g., set) the first electronic device 201 as the main electronic device and determine the second electronic device 202 as the sub electronic device.

In an embodiment, the weight (hereinafter, referred to as a "first weight") applied to the information related to the fall of the user (e.g., the probability that the user is in the fall situation, obtained by the main electronic device) obtained by the electronic device determined as the main electronic device may be set (e.g., assign) to be higher than the weight (hereinafter, referred to as a "second weight") applied to the information related to the fall of the user (e.g., the probability that the user is in the fall situation, obtained by the sub electronic device), obtained by the electronic device determined as the sub electronic device. For example, the main electronic device may be an electronic device in which the first weight higher than the second weight to be applied to fall-related information about the user obtained from the sub electronic device is to be applied to fall-related information about the user obtained from the main electronic device. The sub electronic device may be an electronic device in which the second weight lower than the first weight to be applied to fall-related information about the user obtained from the main electronic device is to be applied to fall-related information about the user obtained from the sub electronic device.

In an embodiment, the main electronic device (e.g., the electronic device determined as the main electronic device) may be an electronic device that allows the main electronic device and the sub electronic device (e.g., the electronic device determined as the sub electronic device) to perform (e.g., trigger) an operation of obtaining information related to the user's fall. Operations of the electronic devices determined as the main electronic device and the sub electronic device are described below in more detail.

In the above-described examples, it has been described that the second electronic device 202 is determined (e.g., set) as the main electronic device and the first electronic device 201 is determined as the sub electronic device, based on determining that the user's posture is the sitting posture, but embodiments of the disclosure are not limited thereto. For example, the processor 550 may determine the first electronic device 201 and the second electronic device 202 as the main electronic device and the sub electronic device, respectively, or may determine the first electronic device 201 and the second electronic device 202 as the sub electronic device and the main electronic device, respectively, according to positions where the first electronic device 201 and the second electronic device 202 are worn on the user (e.g., the position where the first electronic device 201 is worn on the user may vary depending on the type and/or shape of the first electronic device 201) and the user's posture (e.g., whether the user is in the standing posture or the sitting posture).

In an embodiment, based on determining the first electronic device 201 as the main electronic device, the processor 550 may transmit information indicating that the second electronic device 202 is determined as the sub electronic device (and/or information indicating that the first electronic device 201 is determined as the main electronic device) to the second electronic device 202 through the communication circuit 510.

In operation 705, in an embodiment, the processor 550 may obtain first information related to the user's fall through the sensor 530. For example, the processor 550 may obtain the first information related to the user's fall, based on the sensor data obtained through the sensor 530.

In an embodiment, the processor 550 may obtain a fall impact amount (and a waist angle change amount) based on sensor data obtained through the inertial sensor 531. The processor 550 may obtain an atmospheric pressure change amount based on sensor data obtained through the atmospheric pressure sensor 532.

In an embodiment, the processor 550 may calculate a probability that the user is in a fall situation (hereinafter, the probability that the user is in the fall situation, calculated (e.g., estimated) by the first electronic device 201 is referred to as "first information"), based on the obtained fall impact amount (and waist angle change amount) and/or atmospheric pressure change amount (hereinafter, also referred to as a "fall detection-related parameter of the first electronic device 201" or "value of fall detection-related parameter of the first electronic device 201"). For example, the processor 550 may calculate (e.g., estimate) the probability that the fall occurs to the user as the first information using an artificial intelligence (AI) model, based on the obtained fall impact amount (and waist angle change amount) and/or atmospheric pressure change amount. However, embodiments of the disclosure are not limited thereto, and the processor 550 may calculate the probability that a fall occurs to the user as the first information using a designated method (e.g., using a designated algorithm), based on the obtained fall impact amount (and waist angle change amount) and/or atmospheric pressure change amount.

In operation 707, in an embodiment, the processor 550 may receive, from the second electronic device 202 through the communication circuit 510, second information related to the user's fall obtained by the second electronic device 202.

In an embodiment, the second electronic device 202 may obtain second information related to the user's fall through the sensor 630. For example, after the first electronic device 201 is determined as the main electronic device and the second electronic device 202 is determined as the sub electronic device, the second electronic device 202 may obtain the second information related to the user's fall based on the sensor data obtained through the sensor 630.

In an embodiment, the second electronic device 202 may obtain a fall impact amount based on sensor data obtained through the inertial sensor 631. The second electronic device 202 may obtain an atmospheric pressure change amount based on sensor data obtained through the atmospheric pressure sensor 632. The second electronic device 202 may obtain the user's heart rate (e.g., the amount of change in the heart rate), based on sensor data obtained through the biometric sensor 633.

In an embodiment, the second electronic device 202 may calculate the probability that the user is in the fall situation (hereinafter, the probability that the user is in the fall situation, calculated by the second electronic device 202, is referred to as "second information"), based on the obtained fall impact amount, atmospheric pressure change amount, and/or heart rate (hereinafter, also referred to as a "fall detection-related parameter of the second electronic device 202" or "value of fall detection-related parameter of the second electronic device 202"). For example, the second electronic device 202 may calculate the probability that a fall occurs to the user as the second information using the artificial intelligence model, based on the obtained fall impact amount, atmospheric pressure change amount, and/or heart rate. However, embodiments of the disclosure are not limited thereto, and the second electronic device 202 may calculate the probability that a fall occurs to the user as the second information using a designated method (e.g., using a designated algorithm), based on the obtained fall impact amount, atmospheric pressure change amount, and/or heart rate.

In an embodiment, the processor 550 may receive the second information from the second electronic device 202 through the communication circuit 510.

In an embodiment, before performing operations 705 and 707, the processor 550 may determine whether to perform an operation of obtaining the first information by the first electronic device 201 and an operation of obtaining the second information by the second electronic device 202, based on a fall detection-related parameter (e.g., a fall impact amount (and a waist angle change amount) and/or an atmospheric pressure change amount) of the first electronic device 201 obtained by the first electronic device 201, based on determining that the first electronic device 201 is the main electronic device. An operation in which the processor 550 determines whether the first electronic device 201 obtains the first information and the second electronic device 202 obtains the second information is described in more detail with reference to FIGS. 8, 9, and 10.

In FIG. 7, operation 707 is exemplified as being performed after operation 705 is performed, but is not limited thereto. For example, the processor 550 may perform operation 707 before operation 705, or may perform operations 705 and 707 in parallel (or simultaneously).

In operation 709, in an embodiment, the processor 550 may detect a fall of the user by applying a first weight corresponding to the main electronic device to the first information and applying a second weight corresponding to the sub electronic device and lower than the first weight to the second information. For example, the processor 550 may determine whether the user is in the fall situation by applying the first weight corresponding to the main electronic device to the first information and applying the second weight corresponding to the sub electronic device and lower than the first weight to the second information.

In an embodiment, the processor 550 may calculate a final probability that the user is in a fall situation, based on Equation 1 below.

$$P = \omega \times (P_1) + (1 - \omega) \times P_2 \quad \text{[Equation 1]}$$

Equation 1 above is merely an example for helping understanding and, without limitations thereto, may be modified, applied, or expanded in various ways.

In an embodiment, in Equation 1, ω may denote the first weight having a value greater than 0.5 and less than 1, and (1−ω) may denote the second weight. In an embodiment, in Equation 1, $P_1$ may denote information related to the fall of the user obtained from the main electronic device, $P_2$ may denote information related to the fall of the user obtained from the sub electronic device, and P may indicate the final probability that the user is in the fall situation.

In an embodiment, as shown in Equation 1, when the first electronic device 201 is determined as the main electronic device and the second electronic device 202 is determined as the sub electronic device, the processor 550 may calculate the final probability P that the user is in a fall situation by adding the value (e.g., the value obtained by multiplying the first information (e.g., $P_1$) by the first weight ω) obtained by applying the first weight ω to the first information (e.g., $P_1$) and the value (e.g., the value obtained by multiplying the second information (e.g., $P_2$) by the second weight 1−ω) obtained by applying the second weight 1−ω to the second information (e.g., $P_2$). However, the method, performed by the processor 550, of calculating the final probability that the user is in a fall situation is not limited to the above-described example.

In an embodiment, the processor 550 may compare the value of the final probability that the user is in the fall situation with a designated value (e.g., a designated probability value), and may determine that the user is in the fall situation, based on identifying that the value of the final probability that the user is in the fall situation is greater than or equal to the designated value. The processor 550 may determine that the user is not in the fall situation, based on identifying that the value of the final probability that the user is in the fall situation is less than the designated value.

In the above-described examples, it is described that the first electronic device 201 (e.g., the processor 550) determined as the main electronic device determines whether the user is in a fall situation based on the first information and the second information, but embodiments of the disclosure are not limited thereto. For example, a third electronic device (e.g., a smartphone) or a server (e.g., the server 108 of FIG. 1) wirelessly connected to the first electronic device 201 and the second electronic device 202 may determine whether the user is in a fall situation, based on the first information and the second information. For example, the second electronic device 202 may determine whether the user is in a fall situation based on the first information and the second information.

In the above-described examples, it is described that the first electronic device 201 (e.g., the processor 550) determines whether the user is in a fall situation considering both the first information and the second information, but embodiments of the disclosure are not limited thereto. For example, when the posture of the user is determined as the standing posture by the first electronic device 201, the first electronic device 201 may determine whether the user is in a fall situation by considering only the first information. For example, when the posture of the user is determined as the sitting posture by the first electronic device 201, the second electronic device 202 may determine whether the user is in a fall situation by considering only the second information.

In an embodiment, the processor 550 may output information indicating that the fall of the user is detected, based on detection of the fall of the user (e.g., based on determining that the user is in the fall situation). For example, the processor 550 may display the notification indicating that the user's fall is detected through the display module included in the first electronic device 201. For example, the processor 550 may output, through the speaker included in the first electronic device 201, the notification indicating that the user's fall is detected in an audio form. For example, the processor 550 may output the notification indicating that the fall of the user is detected in a vibration form through the haptic module included in the first electronic device 201. For example, the processor 550 may output the notification indicating that the user's fall is detected in the form of light through the light output module (e.g., LED module) included in the first electronic device 201. However, the method in which the first electronic device 201 outputs the information indicating that the user's fall is detected is not limited to the above-described examples. In an embodiment, the processor 550 may allow the second electronic device 202 and/or the third electronic device (e.g., a smartphone) to output the information indicating that the user's fall is detected.

In an embodiment, when the fall of the user is detected, the processor 550 may transmit information related to the detection of the fall to the second electronic device 202 (and/or the third electronic device) through the communication circuit 510 so that the second electronic device 202 (and/or the third electronic device) outputs information indicating that the fall is detected. For example, the processor 550 may transmit information related to the user's fall (e.g., information indicating that the user's fall is detected) to the second electronic device 202 and/or the third electronic device through the communication circuit 510 so that the second electronic device 202 and/or the third electronic device (e.g., a smartphone) outputs information indicating that the user's fall is detected. In this case, the second electronic device 202 and/or the third electronic device (e.g., smartphone) may display a notification indicating that the user's fall is detected through the display module, may output the notification through the speaker, may output a vibration indicating the notification through the haptic module, or may output light indicating that the user's fall is detected.

In an embodiment, the processor 550 may allow the first electronic device 201 and the second electronic device 202 (and the third electronic device) to output notifications in different forms. For example, the processor 550 may output, through the speaker, a notification indicating that the user's fall is detected in an audio format, and may allow the second electronic device 202 (and the third electronic device) to display the notification through the display module.

In an embodiment, based on the detection of the user's fall, the processor 550 may identify whether the movement of the user is detected through the inertial sensor 531 for a designated time from the time point at which the user's fall is detected. The processor 550 may output information indicating that the user's fall is detected, based on the movement of the user not being detected for the designated time. Hereinafter, the time when the user's movement is not detected after fall detection is also referred to as an "inactivity time". In an embodiment, the processor 550 may output information indicating that the user's fall is detected, a threshold inactivity time after the time when the user's fall is detected (e.g., the time when the user is determined to be in the fall situation). In an embodiment, the processor 550 may make a phone call with an electronic device having designated contact info (e.g., contact info about the user's acquaintance and/or emergency contact info) through the communication circuit 510, a threshold inactivity time after the time when the user's fall is detected (e.g., the time when the user is determined to be in the fall situation). However, embodiments of the disclosure are not limited thereto, and in an embodiment, the processor 550 may output information indicating that the user's fall is detected in response to detection of the user's fall (e.g., immediately after the user's fall is detected).

In the above-described examples, it is described that the first electronic device 201 and/or the second electronic device 202 detects the user's fall, but embodiments of the disclosure are not limited thereto. In an embodiment, the processor 550 may detect the user's fall by further considering information received from at least one peripheral device (e.g., a camera device) positioned around the first electronic device 201 and/or the second electronic device 202. For example, the processor 550 may more accurately detect whether the user falls by comparing whether the user falls, detected from the first electronic device 201 and/or the second electronic device 202, with an image obtained from the camera device capturing the user.

Figure 9:
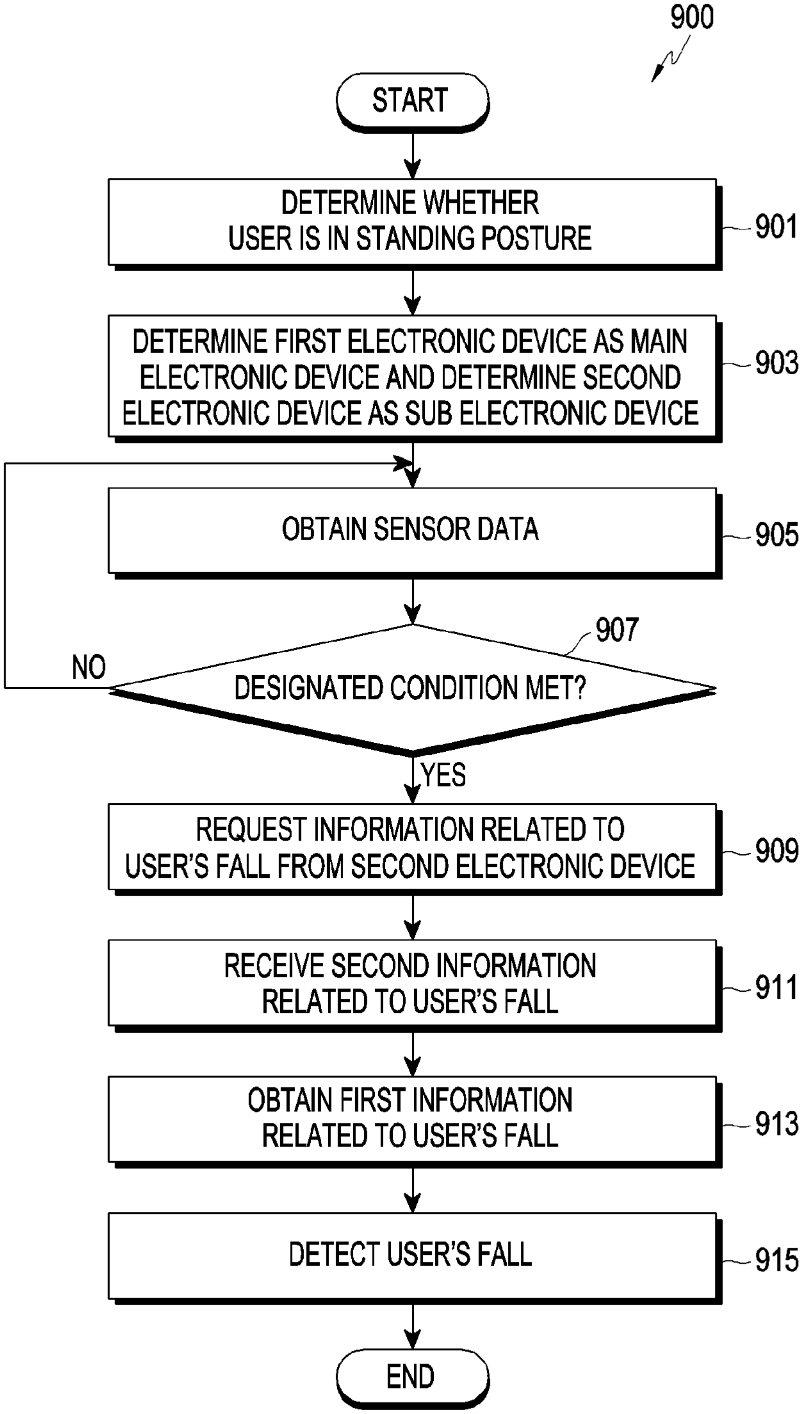
FIG. 9 is a flowchart illustrating an operation for detecting a user's fall according to an embodiment.

FIG. 9 is a flowchart 900 illustrating a method for detecting a fall of a user, according to an embodiment.

In the following embodiment, the operations may be sequentially performed, but may be performed non-sequentially. For example, the order of the operations may be changed, and at least two operations may be performed in parallel.

Referring to FIG. 9, at operation 901, in an embodiment, a processor (e.g., processor 550 of FIG. 5) may determine whether the user wearing the first electronic device (e.g., the first electronic device 201 of FIG. 5) is in the standing posture through the sensor (e.g., the sensor 530 of FIG. 5).

Since operation 901 is at least partially the same or similar to the operation 701 of FIG. 7, no detailed description thereof is presented below.

In operation 903, in an embodiment, based on determining that the posture of the user is the standing posture, the processor 550 may determine the first electronic device 201 as the main electronic device and may determine the second electronic device 202 as the sub electronic device.

Since operation 903 is at least partially the same or similar to the operation 703 of FIG. 7, no detailed description thereof is presented below.

In operation 905, in an embodiment, the processor 550 may obtain sensor data through the sensor 530.

In an embodiment, the processor 550 may obtain the value (e.g., the fall impact amount (and the waist angle change amount) and/or the atmospheric pressure change amount) of the fall detection-related parameter of the first electronic device 201, based on sensor data obtained through the sensor 530.

In operation 907, in an embodiment, after the first electronic device 201 is determined as the main electronic device, the processor 550 may identify whether the value of the fall detection-related parameter of the first electronic device 201 meets a designated condition.

In an embodiment, the processor 550 may identify whether the value of the fall detection-related parameter of the first electronic device 201 is greater than or equal to a threshold. When the value of the fall detection-related parameter of the first electronic device 201 is greater than or equal to the threshold, the processor 550 may determine that the value of the fall detection-related parameter of the first electronic device 201 meets the designated condition. For example, the processor 550 may identify whether the obtained fall impact amount is greater than or equal to a threshold fall impact amount, whether the obtained waist angle change amount is greater than or equal to a threshold waist angle change amount, and whether the obtained atmospheric pressure change amount is greater than or equal to a threshold atmospheric pressure change amount. Based on identifying that the obtained fall impact amount is equal to or greater than the threshold fall impact amount, the obtained waist angle change amount is equal to or greater than the threshold waist angle change amount, and the obtained atmospheric pressure change amount is equal to or greater than the threshold atmospheric pressure change amount, the processor 550 may identify that the value of the fall detection-related parameter of the first electronic device 201 meets the designated condition. However, embodiments of the disclosure are not limited thereto. For example, the processor 550 may identify at least one of whether the obtained fall impact amount is greater than or equal to a threshold fall impact amount, whether the obtained waist angle change amount is greater than or equal to a threshold waist angle change amount, or whether the obtained atmospheric pressure change amount is greater than or equal to a threshold atmospheric pressure change amount. Based on identifying that the obtained fall impact amount is equal to or greater than the threshold fall impact amount, the obtained waist angle change amount is equal to or greater than the threshold waist angle change amount, and/or the obtained atmospheric pressure change amount is equal to or greater than the threshold atmospheric pressure change amount, the processor 550 may identify that the value of the parameter related to the fall detection by the first electronic device 201 meets the designated condition.

In an embodiment, based on identifying that the value of the fall detection-related parameter of the first electronic device 201 does not meet the designated condition in operation 907, the processor 550 may perform an operation of obtaining sensor data through the sensor 530 in operation 905.

In operation 909, in an embodiment, based on identifying that the value of the fall detection-related parameter of the first electronic device 201 meets the designated condition in operation 907, the processor 550 may request information (e.g., second information) related to the user's fall from the second electronic device 202 through the communication circuit 510.

In an embodiment, based on identifying that the value of the fall detection-related parameter of the first electronic device 201 meets the designated condition in operation 907, the processor 550 may transmit information (e.g., a control signal) for allowing the second electronic device 202 to perform an operation of obtaining the second information to the second electronic device 202 through the communication circuit 510.

In operation 911, in an embodiment, the processor 550 may receive, from the second electronic device 202 through the communication circuit 510, second information related to the user's fall obtained by the second electronic device 202.

Since operation 911 is at least partially the same or similar to the operation 707 of FIG. 7, no detailed description thereof is presented below.

In operation 913, in an embodiment, the processor 550 may obtain first information related to the user's fall through the sensor 530.

Since operation 913 is at least partially the same or similar to the operation 705 of FIG. 7, no detailed description thereof is presented below.

In FIG. 9, operation 913 is exemplified as being performed after operations 909 and 911 is performed, but is not limited thereto. For example, the processor 550 may perform operation 913 before operation 909 or operation 911, or may perform operation 913 in parallel (or simultaneously) with operation 909 and operation 911.

In operation 915, in an embodiment, the processor 550 may detect the user's fall by applying a first weight corresponding to the main electronic device to the first information and applying a second weight corresponding to the sub electronic device and lower than the first weight to the second information.

Since operation 915 is at least partially the same as or similar to operation 709 of FIG. 7, a detailed description thereof will be omitted.

Figure 10:
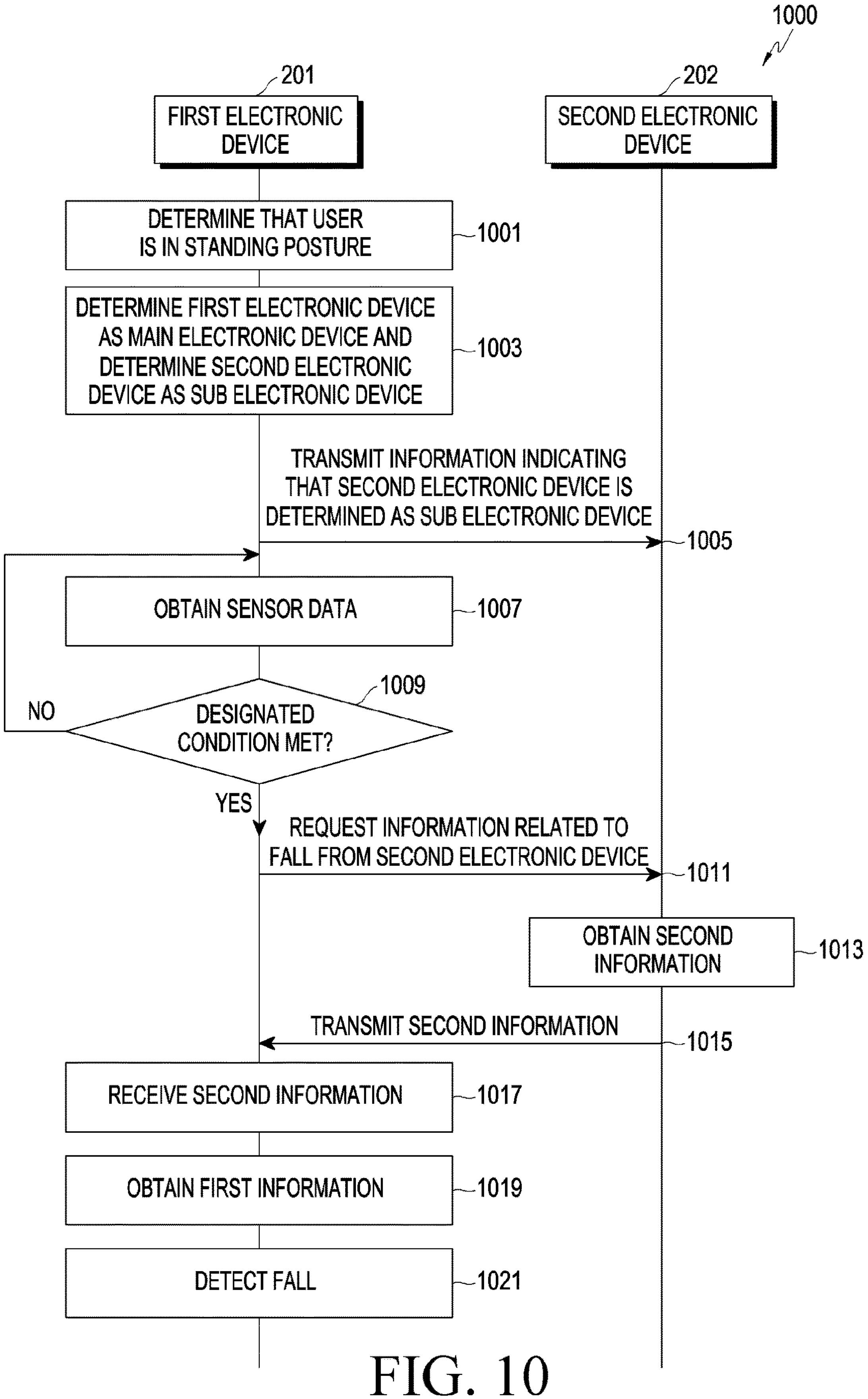
FIG. 10 is a flowchart illustrating an operation for detecting a user's fall according to an embodiment.

FIG. 10 is a flowchart 1000 illustrating a method for detecting a fall of a user, according to an embodiment.

In the following embodiment, the operations may be sequentially performed, but may be performed non-sequentially. For example, the order of the operations may be changed, and at least two operations may be performed in parallel.

According to an embodiment, it may be understood that operations 1001 to 1021 are performed by a processor (e.g., the processor 550 of FIG. 5) of the first electronic device 201 or a processor (e.g., the processor 650 of FIG. 6) of the second electronic device 202.

In an embodiment, FIG. 10 may be a view illustrating an operation in which the first electronic device 201 and the second electronic device 202 interwork to detect a user's fall when the first electronic device 201 is determined as the main electronic device and the second electronic device 202 is determined as the sub electronic device.

Referring to FIG. 10, in operation 1001, in an embodiment, the first electronic device 201 (e.g., the processor 550) may determine, through a sensor (e.g., the sensor 530 of FIG. 5), that the posture of the user wearing the first electronic device 201 is the standing posture (or that the user is walking).

In operation 1001, in an embodiment, the first electronic device 201 may determine that the posture of the user is the standing posture. For example, the processor (e.g., the processor 550 of FIG. 5) may determine that the posture of the user wearing the first electronic device 201 is the standing posture through the sensor (e.g., the sensor 530 of FIG. 5).

In operation 1003, in an embodiment, based on determining that the posture of the user is the standing posture, the first electronic device 201 may determine the first electronic device 201 as the main electronic device and may determine the second electronic device 202 as the sub electronic device.

Since operation 1003 is at least partially the same or similar to the operation 903 of FIG. 9, no detailed description thereof is presented below.

In operation 1005, in an embodiment, based on determining the first electronic device 201 as the main electronic device and determining the second electronic device 202 as the sub electronic device, the first electronic device 201 may transmit information indicating that the second electronic device 202 is determined as the sub electronic device (and/or information indicating that the first electronic device 201 is determined as the main electronic device) to the second electronic device 202 through the (e.g., the communication circuit 510 of FIG. 5).

In operation 1007, in an embodiment, the first electronic device 201 may obtain sensor data through the sensor 530.

Since operation 1007 is at least partially the same or similar to the operation 905 of FIG. 9, no detailed description thereof is presented below.

In operation 1009, in an embodiment, after the first electronic device 201 is determined as the main electronic device, the first electronic device 201 may identify whether the value of the fall detection-related parameter of the first electronic device 201 meets a designated condition.

Since operation 1009 is at least partially identical or similar to operation 907 of FIG. 9, no duplicate description thereof is presented below.

In an embodiment, based on identifying that the value of the fall detection-related parameter of the first electronic device 201 does not meet the designated condition in operation 1009, the first electronic device 201 may perform an operation of obtaining sensor data through the sensor 530 in operation 1007.

In operation 1011, in an embodiment, based on identifying that the value of the fall detection-related parameter of the first electronic device 201 meets the designated condition in operation 1009, the first electronic device 201 may request information (e.g., second information) related to the user's fall from the second electronic device 202 through the communication circuit 510.

Since operation 1011 is at least partially identical or similar to operation 909 of FIG. 9, no duplicate description thereof is presented below.

In operation 1013, in an embodiment, the second electronic device 202 may obtain second information, based on the request received from the first electronic device 201 through the communication circuit (e.g., the communication circuit 610 of FIG. 6).

In an embodiment, the second electronic device 202 may obtain the value of the fall detection-related parameter of the second electronic device 202 through the sensor (e.g., the sensor 630 of FIG. 6). For example, the second electronic device 202 may obtain the fall impact amount based on sensor data obtained through an inertial sensor (e.g., the inertial sensor 631 of FIG. 6). The second electronic device 202 may obtain an atmospheric pressure change amount based on sensor data obtained through an atmospheric pressure sensor (e.g., the atmospheric pressure sensor 632 of FIG. 6). The second electronic device 202 may obtain the user's heart rate (e.g., the amount of change in the heart rate), based on sensor data obtained through a biometric sensor (e.g., the biometric sensor 633 of FIG. 6).

In an embodiment, the second electronic device 202 may calculate second information (e.g., the probability that the user is in a fall situation), based on the obtained value of the fall detection-related parameter of the second electronic device 202.

In operation 1015, in an embodiment, the second electronic device 202 may transmit the obtained second information to the first electronic device 201 through the communication circuit 610.

In operation 1017, in an embodiment, the first electronic device 201 may receive the second information from the second electronic device 202 through the communication circuit 510.

In operation 1019, in an embodiment, the first electronic device 201 may obtain first information related to the user's fall through the sensor 530.

Since operation 1019 is at least partially the same or similar to the operation 913 of FIG. 9, no detailed description thereof is presented below.

In FIG. 10, operation 1019 is exemplified as being performed after operations 1011 to 1017 is performed, but is not limited thereto. For example, operation 1019 may be performed before at least one of operations 1011 to 1017, or operation 1019 may be performed in parallel (or simultaneously) with operations 1011 to 1017.

In operation 1021, in an embodiment, the first electronic device 201 may detect the user's fall by applying a first weight corresponding to the main electronic device to the first information and applying a second weight corresponding to the sub electronic device and lower than the first weight to the second information.

Since operation 1021 is at least partially the same or similar to the operation 915 of FIG. 9, no detailed description thereof is presented below.

Figure 11:
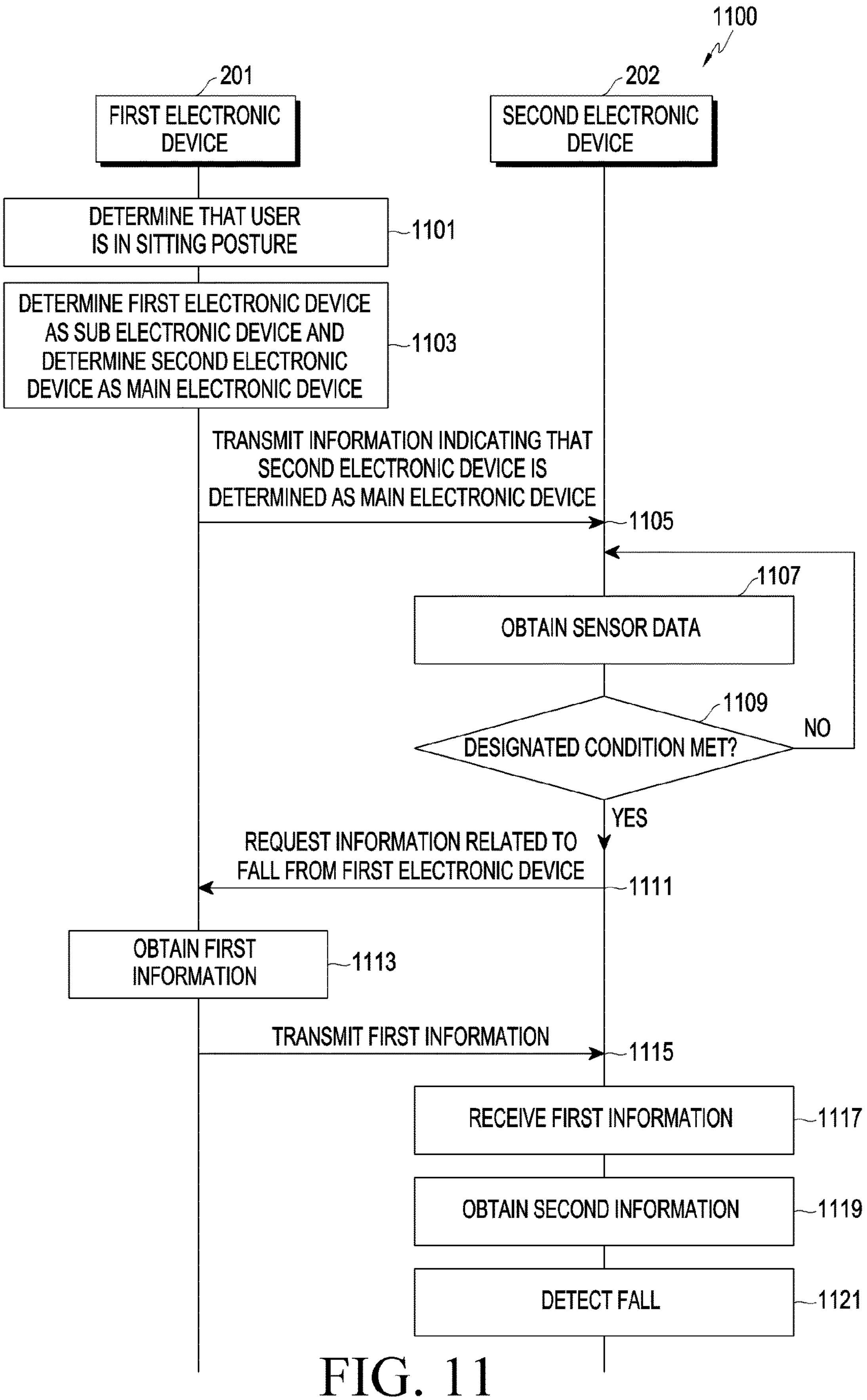
FIG. 11 is a flowchart illustrating an operation for detecting a user's fall according to an embodiment.

FIG. 11 is a flowchart 1100 illustrating a method for detecting a fall of a user, according to an embodiment.

According to an embodiment, it may be understood that operations 1101 to 1121 are performed by a processor (e.g., the processor 550 of FIG. 5) of the first electronic device 201 or a processor (e.g., the processor 650 of FIG. 6) of the second electronic device 202.

In the following embodiment, the operations may be sequentially performed, but may be performed non-sequentially. For example, the order of the operations may be changed, and at least two operations may be performed in parallel.

In an embodiment, FIG. 11 may be a view illustrating an operation in which the first electronic device 201 and the second electronic device 202 interwork to detect a user's fall when the first electronic device 201 is determined as the sub electronic device and the second electronic device 202 is determined as the main electronic device.

Referring to FIG. 11, in operation 1101, in an embodiment, the first electronic device 201 (e.g., the processor 550) may determine, through a sensor (e.g., the sensor 530 of FIG. 5), that the posture of the user wearing the first electronic device 201 is the sitting posture.

In operation 1101, in an embodiment, the first electronic device 201 may determine that the posture of the user is the sitting posture. For example, the processor (e.g., the processor 550 of FIG. 5) may determine that the posture of the user wearing the first electronic device 201 is the sitting posture through the sensor (e.g., the sensor 530 of FIG. 5).

In operation 1103, in an embodiment, the first electronic device 201 may determine the first electronic device 201 as the sub electronic device and may determine the second electronic device 202 as the main electronic device, based on determining that the posture of the user is the sitting posture.

In operation 1105, in an embodiment, based on determining the first electronic device 201 as the sub electronic device and determining the second electronic device 202 as the main electronic device, the first electronic device 201 may transmit information indicating that the second electronic device 202 is determined as the main electronic device (and/or information indicating that the first electronic device 201 is determined as the sub electronic device) to the second electronic device 202 through the (e.g., the communication circuit 510 of FIG. 5).

In operation 1107, in an embodiment, the second electronic device 202 (e.g., the processor 650) may obtain sensor data through a sensor (e.g., the sensor 630 of FIG. 6).

In an embodiment, the second electronic device 202 may obtain the value (e.g., the fall impact amount, an atmospheric pressure change amount, and/or the heart rate) of the fall detection-related parameter of the second electronic device 202, based on sensor data obtained through the sensor 630.

In operation 1109, in an embodiment, after the second electronic device 202 is determined as the main electronic device, the second electronic device 202 may identify whether the value of the fall detection-related parameter of the second electronic device 202 meets a designated condition. For example, the second electronic device 202 may identify whether the obtained fall impact amount is greater than or equal to a threshold fall impact amount, whether the obtained atmospheric pressure change amount is greater than or equal to a threshold atmospheric pressure change amount, and whether the obtained heart rate change amount is greater than or equal to a threshold heart rate change amount. The second electronic device 202 may identify that the value of the fall detection-related parameter of the second electronic device 202 meets the designated condition, based on identifying that the obtained fall impact amount is equal to or greater than the threshold fall impact amount, the obtained atmospheric pressure change amount is equal to or greater than the threshold atmospheric pressure change amount, and the obtained heart rate change amount is equal to or greater than the threshold heart rate change amount. However, embodiments of the disclosure are not limited thereto. For example, the second electronic device 202 may identify at least one of whether the obtained fall impact amount is greater than or equal to a threshold fall impact amount, whether the obtained atmospheric pressure change amount is greater than or equal to a threshold atmospheric pressure change amount, or whether the obtained heart rate change amount is greater than or equal to a threshold heart rate change amount. The second electronic device 202 may identify that the value of the fall detection-related parameter of the second electronic device 202 meets the designated condition, based on identifying that the obtained fall impact amount is equal to or greater than the threshold fall impact amount, the obtained atmospheric pressure change amount is equal to or greater than the threshold atmospheric pressure change amount, and/or the obtained heart rate change amount is equal to or greater than the threshold heart rate change amount.

In an embodiment, based on identifying that the value of the fall detection-related parameter of the second electronic device 202 does not meet the designated condition in operation 1109, the second electronic device 202 may perform an operation of obtaining sensor data through the sensor 630 in operation 1107.

In operation 1111, in an embodiment, based on identifying that the value of the fall detection-related parameter of the second electronic device 202 meets the designated condition in operation 1109, the second electronic device 202 may request information (e.g., first information) related to the user's fall from the first electronic device 201 through the communication circuit (e.g., the communication circuit 610 of FIG. 6).

Since operation 1111 is at least partially identical or similar to operation 1011 of FIG. 10, no duplicate description thereof is presented below.

In operation 1113, in an embodiment, the first electronic device 201 may obtain first information, based on the request received from the second electronic device 202 through the communication circuit 510.

Since operation 1113 is at least partially identical or similar to operation 1019 of FIG. 10, no duplicate description thereof is presented below.

In operation 1115, in an embodiment, the first electronic device 201 may transmit the obtained first information to the second electronic device 202 through the communication circuit 510.

In operation 1117, in an embodiment, the second electronic device 202 may receive the first information from the first electronic device 201 through the communication circuit 610.

In operation 1119, in an embodiment, the second electronic device 202 may obtain second information related to the user's fall through the sensor 630.

Since operation 1119 is at least partially the same or similar to the operation 1013 of FIG. 10, no detailed description thereof is presented below.

In FIG. 11, operation 1119 is exemplified as being performed after operations 1111 to 1117 is performed, but is not limited thereto. For example, the second electronic device 202 may perform operation 1119 before at least one of operations 1111 to 1117, or may perform operation 1119 in parallel (or simultaneously) with operations 1111 to 1117.

In operation 1121, in an embodiment, the second electronic device 202 may detect the user's fall by applying a second weight corresponding to the sub electronic device to the first information and applying a first weight corresponding to the main electronic device and higher than the second weight to the second information.

Since operation 1121 is at least partially the same or similar to the operation 1021 of FIG. 10, no detailed description thereof is presented below.

Figure 12:
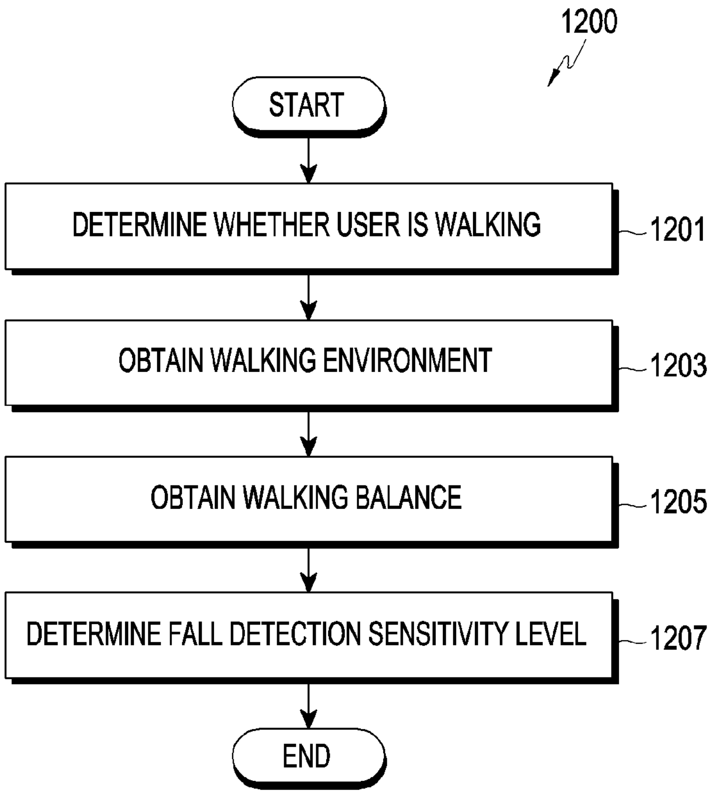
FIG. 12 is a flowchart illustrating an operation for setting a fall detection sensitivity level according to an embodiment.

FIG. 12 is a flowchart 1200 illustrating a method for setting a fall detection sensitivity level according to an embodiment.

In the following embodiment, the operations may be sequentially performed, but may be performed non-sequentially. For example, the order of the operations may be changed, and at least two operations may be performed in parallel.

Referring to FIG. 12, in operation 1201, in an embodiment, a processor (e.g., the processor 550 of FIG. 5) may determine whether a user wearing a first electronic device (e.g., the first electronic device 201 of FIG. 5) (and a second electronic device (e.g., the second electronic device 202 of FIG. 6)) is walking.

In an embodiment, the processor 550 may obtain sensor data through a sensor (e.g., the sensor 530 of FIG. 5). The processor 550 may determine whether the user is walking, based on the obtained sensor data. For example, the processor 550 may obtain the swing period of the foot of the user and/or the period during which the foot of the user is in contact with the ground, based on sensor data obtained through an inertial sensor (e.g., the inertial sensor 531 of FIG. 5). The processor 550 may determine whether the user is walking (e.g., whether the user is walking in the standing posture), based on the swing period of the foot of the user and/or the period during which the foot of the user is in contact with the ground. For example, the processor 550 may obtain the gait pattern of the user based on the sensor data obtained through the inertial sensor 531. The processor 550 may determine whether the user is walking based on the obtained gait pattern. For example, the processor 550 may obtain the periodic movement of the leg (e.g., the angle of the leg joint) of the user based on the sensor data obtained through the angle sensor 533. The processor 550 may determine whether the user is walking based on the obtained periodic movement of the legs of the user.

In an embodiment of the disclosure, the processor 550 may repeatedly perform the operation of obtaining sensor data through the sensor 530, based on determining that the user is not walking.

In operation 1203, in an embodiment, based on determining that the user is walking in operation 1201, the processor 550 may obtain a walking environment in which the user is walking through the sensor 530.

In an embodiment, the processor 550 may identify an atmospheric pressure change while the user is walking, based on sensor data obtained through an atmospheric pressure sensor (e.g., the atmospheric pressure sensor 532 of FIG. 5).

In an embodiment of the disclosure, the processor 550 may determine that the walking environment is a slope (e.g., a situation in which the user walks on the slope), based on identifying that the atmospheric pressure gradually decreases or increases while the user is walking. For example, the processor 550 may determine that the user is going down a slope (e.g., stairs), based on identifying that the atmospheric pressure gradually decreases while the user is walking. For example, the processor 550 may determine that the user is going up the slope, based on identifying that the atmospheric pressure gradually increases while the user is walking.

In an embodiment, the processor 550 may determine that the walking environment is a flat (e.g., a situation in which the user walks on the flat), based on identifying that a change in atmospheric pressure is equal to or less than a threshold change while the user is walking.

In operation 1205, in an embodiment, the processor 550 may obtain the walking balance of the user through the sensor 530.

In an embodiment, the processor 550 may obtain the swing period and/or the maximum ground impact amount of each of the steps of the left foot and the step of the right foot during one step, based on the sensor data obtained through the inertial sensor 531. The processor 550 may obtain the maximum angle of the hip joint of each of the step of the left foot and the step of the right foot during one step, based on the sensor data obtained through the angle sensor (e.g., the angle sensor 533 of FIG. 5). The processor 550 may obtain the walking balance based on the swing period of each of the step of the left foot and the step of the right foot, the maximum ground impact amount, and/or the maximum angle of the hip joint during one step.

In an embodiment, the processor 550 may obtain the walking balance using Equations 2 and 3 below, based on the swing period of each of the step of the left foot and the step of the right foot, the maximum ground impact amount, and/or the maximum angle of the hip joint during one step.

$$F_{left} = (1/3)\times(\alpha\times T_{left} + \beta\times P_{left} + \gamma\times A_{left}) \quad \text{[Equation 2]}$$

$$F_{right} = (1/3)\times(\alpha\times T_{rightt} + \beta\times P_{right} + \gamma\times A_{right}) \quad \text{[Equation 3]}$$

Equations 2 and 3 above are merely an example for helping understanding and, without limitations thereto, may be modified, applied, or expanded in various ways.

In an embodiment, in Equation 2, $T_{left}$, $P_{left}$, and $A_{left}$ may indicate the swing period of the left foot, the maximum ground impact amount, and the maximum hip joint angle, respectively, during one step. In Equation 3, $T_{right}$, $P_{right}$, and $A_{right}$ may indicate the swing period of the right foot, the maximum ground impact amount, and the maximum hip joint angle, respectively, during one step. In Equation 2 and Equation 3, α, β, and γ may be coefficients (or parameters).

In an embodiment, the processor 550 may calculate the walking balance (e.g., the value indicating the walking balance) using $F_{left}$ and $F_{right}$ of Equation 2 and Equation 3. For example, when $F_{left}$ is equal to or greater than $F_{right}$, the processor 550 may determine a value obtained by dividing $F_{right}$ by $F_{left}$ (e.g., a ratio of $F_{left}$ to $F_{right}$) as a value indicating the walking balance. When $F_{left}$ is less than $F_{right}$, the processor 550 may determine a value obtained by dividing $F_{left}$ by $F_{right}$ (e.g., a ratio of $F_{right}$ to $F_{left}$) as a value indicating the walking balance. According to an embodiment, as the value indicating the walking balance approaches 1, the walking balance of the user may be better, and as the value indicating the walking balance approaches 0, the walking balance of the user may be poorer.

In operation 1207, in an embodiment, the processor 550 may determine the fall detection sensitivity level, based on the walking environment and/or the walking balance.

In an embodiment, the level of the fall detection sensitivity may be a level for determining (e.g., setting or adjusting) thresholds of the fall detection-related parameters of the first electronic device 201 and the second electronic device 202. For example, the level of fall detection sensitivity may correspond to (e.g., may be mapped to) thresholds of fall detection-related parameters of the first electronic device 201 and the second electronic device 202.

In an embodiment, the level of the fall detection sensitivity may be determined to be a higher level as the risk of the user's fall increases.

In an embodiment, as the walking balance is poorer, the risk of the user's fall may be relatively higher, and when the walking balance is better, the risk of the user's fall may be relatively lower. In an embodiment, the processor 550 may determine the level of the fall detection sensitivity as a relatively high level as the walking balance is poor, and may determine the level of the fall detection sensitivity as a relatively low level as the walking balance is good.

In an embodiment, when the user walks on a flat, the risk of the user's fall may be lower than when the user walks on a slope. In an embodiment, when the walking environment is a flat, the processor 550 may determine the level of fall detection sensitivity as a lower level than when the walking environment is a slope.

In an embodiment, when the user is going down the slope, the risk of the user's fall may be higher than when the user is going up the slope. In an embodiment, even when the walking environments are substantially the same slopes, when the user goes up the slope, the processor 550 may determine the level of the fall detection sensitivity to be a lower level than when the user goes down the slope.

In an embodiment, the processor 550 may determine the level of the fall detection sensitivity as shown in Table 3 below, based on the walking environment and the walking balance.

TABLE 3

| Walking environment | Walking balance | Level of fall detection sensitivity |
|---|---|---|
| flat | 0.96 or more, and 1.00 or less | level 1 |
| | 0.86 or more, and 0.95 or less | level 2 |
| | 0.66 or more, and 0.85 or less | level 3 |
| | 0.00 or more, and 0.65 or less | level 4 |
| slope | 0.96 or more, and 1.00 or less | level 2 |
| | 0.86 or more, and 0.95 or less | level 3 |
| | 0.66 or more, and 0.85 or less | level 4 |
| | 0.00 or more, and 0.65 or less | level 4 |

In an embodiment, in Table 3, the level of fall detection sensitivity may increase in the order of level 1, level 2, level 3, and level 4. For example, among levels 1 to 4, level 1 may be the lowest level and level 4 may be the highest level. In an embodiment, Table 3 illustrates that the level of fall detection sensitivity is divided into four levels, i.e., levels 1 to 4, but is not limited thereto. For example, the level of fall detection sensitivity may be divided into 5 or more or 3 or less.

In an embodiment, as described above, the level of the fall detection sensitivity may correspond to thresholds of the fall detection-related parameters of the first electronic device 201 and the second electronic device 202. For example, as the level of fall detection sensitivity increases, thresholds of fall detection-related parameters of the first electronic device 201 and the second electronic device 202 may be set (e.g., adjusted) to be lower.

In an embodiment, after determining the level of the fall detection sensitivity based on the walking environment and/or the walking balance, the processor 550 may set (e.g., adjust) the thresholds of the fall detection-related parameters of the first electronic device 201 (and the second electronic device 202) to correspond to the determined level of the fall detection sensitivity.

In an embodiment, the level of the fall detection sensitivity and the thresholds of the fall detection-related parameters of the first electronic device 201 may be mapped as shown in Table 4 below.

TABLE 4

| Level of fall detection sensitivity | Threshold fall impact amount (G) | Threshold atmospheric pressure change amount (hPa) | Threshold waist angle change amount | Threshold inactivity time (s) |
|---|---|---|---|---|
| level 1 | 20 | 0.4 | 65 | 60 |
| level 2 | 20 | 0.4 | 60 | 60 |
| level 3 | 15 | 0.32 | 50 | 40 |
| level 4 | 10 | 0.32 | 50 | 30 |

In an embodiment, the level of the fall detection sensitivity and the thresholds of the fall detection-related parameters of the second electronic device 202 may be mapped as shown in Table 5 below.

TABLE 5

| Level of fall detection sensitivity | Threshold fall impact amount (G) | Threshold atmospheric pressure change amount (hPa) | Heart rate change amount (bpm) | Threshold inactivity time (s) |
|---|---|---|---|---|
| level 1 | 20 | 0.4 | Reference heart rate when falling | 60 |
| level 2 | 20 | 0.4 | Reference heart rate when falling * 0.9 | 60 |
| level 3 | 15 | 0.32 | Reference heart rate when falling * 0.8 | 40 |
| level 4 | 10 | 0.32 | Reference heart rate when falling * 0.6 | 30 |

In an embodiment, when the user wears a third electronic device (e.g., a head mounted display (HMD) device or earbuds) together with the first electronic device 201 and/or the second electronic device 202, information about the movement of the user's upper body and/or head obtained through the third electronic device may be obtained. In an embodiment, the level of the fall detection sensitivity may be set (e.g., adjusted) based on the user's posture obtained through the first electronic device 201 and/or the second electronic device 202 and information about the user's upper body and/or head movement obtained through the third electronic device. In an embodiment, the processor 550 may obtain the direction in which the line connecting the upper body (and/or the head) and the waist of the user faces, based on the information about the movement of the upper body and/or the head of the user obtained through the third electronic device. The processor 550 may determine the level of the fall detection sensitivity as a relatively lower level as the obtained direction and the ground are closer to being perpendicular to each other. However, embodiments of the disclosure are not limited thereto.

In an embodiment, the processor 550 may set (e.g., adjust) the level of fall detection sensitivity, based on whether the user is hand-swinging while walking.

In an embodiment, the hand swing when walking may refer to the user's motion of naturally shaking his/her arm forward/backward while walking. The hand swing while walking may offset the rotational force of the butt muscles of the user, thereby preventing the user's body from unintentionally rotating while increasing a sense of balance. The hand swing while walking, in particular, a hand swing while walking with a low walking balance, may prevent a fall.

In an embodiment, the processor 550 may receive information about whether the user is hand-swinging from the second electronic device 202 through a communication circuit (e.g., the communication circuit 510 of FIG. 5). For example, the second electronic device 202 may determine whether the user wearing the second electronic device 202 is hand-swinging, based on sensor data obtained through an inertial sensor (e.g., the inertial sensor 631 of FIG. 6). The second electronic device 202 may transmit information about whether the determined user is hand-swinging to the first electronic device 201 through the communication circuit 610. The processor 550 may determine whether the user is hand-swinging, based on the information received from the second electronic device 202 through the communication circuit 510.

In an embodiment, when the user is hand-swinging while walking, the processor 550 may adjust the level of the fall detection sensitivity to be lower than the currently set level of the fall detection sensitivity. When the user is not hand-swinging while walking, the processor 550 may adjust the level of the fall detection sensitivity to be higher than the currently set level of the fall detection sensitivity.

In an embodiment, the processor 550 may set an initial level of the fall detection sensitivity to level 1 as a default level. For example, when the first electronic device 201 is powered on, the processor 550 may set the level of fall detection sensitivity to level 1. However, embodiments of the disclosure are not limited thereto, and for example, the processor 550 may set the initial level of the fall detection sensitivity based on the user setting or the information set in the first electronic device 201. In an embodiment, when the initial level of the fall detection sensitivity is set, the processor 550 may adjust the initial level of the fall detection sensitivity based on the walking environment, the walking balance, and/or whether the user is hand-swinging.

Although FIG. 12 illustrates that the first electronic device 201 (e.g., the processor 550) sets (e.g., adjusts) a fall detection sensitivity level, embodiments of the disclosure are not limited thereto. For example, the second electronic device 202, the third electronic device (e.g., a smartphone), a server (e.g., the server 108 of FIG. 1), the electronic device determined as the main electronic device, or the electronic device determined as the sub electronic device may set the fall detection sensitivity level.

In an embodiment, when the first electronic device 201 (e.g., the processor 550) (or the second electronic device 202) sets (e.g., adjusts) the fall detection sensitivity level, the first electronic device 201 (or the second electronic device 202) may transmit the set fall detection sensitivity level to the second electronic device 202 (or the first electronic device 201) through the communication circuit (e.g., the communication circuit 510 of FIG. 1). The second electronic device 202 (or the first electronic device 201) may set (e.g., adjust) the fall detection sensitivity level of the second electronic device 202 (or the first electronic device 201), based on the received fall detection sensitivity level. For example, the second electronic device 202 may set (e.g., adjust) the fall detection sensitivity level of the second electronic device 202 to be identical to the received fall detection sensitivity level.

Figure 13:
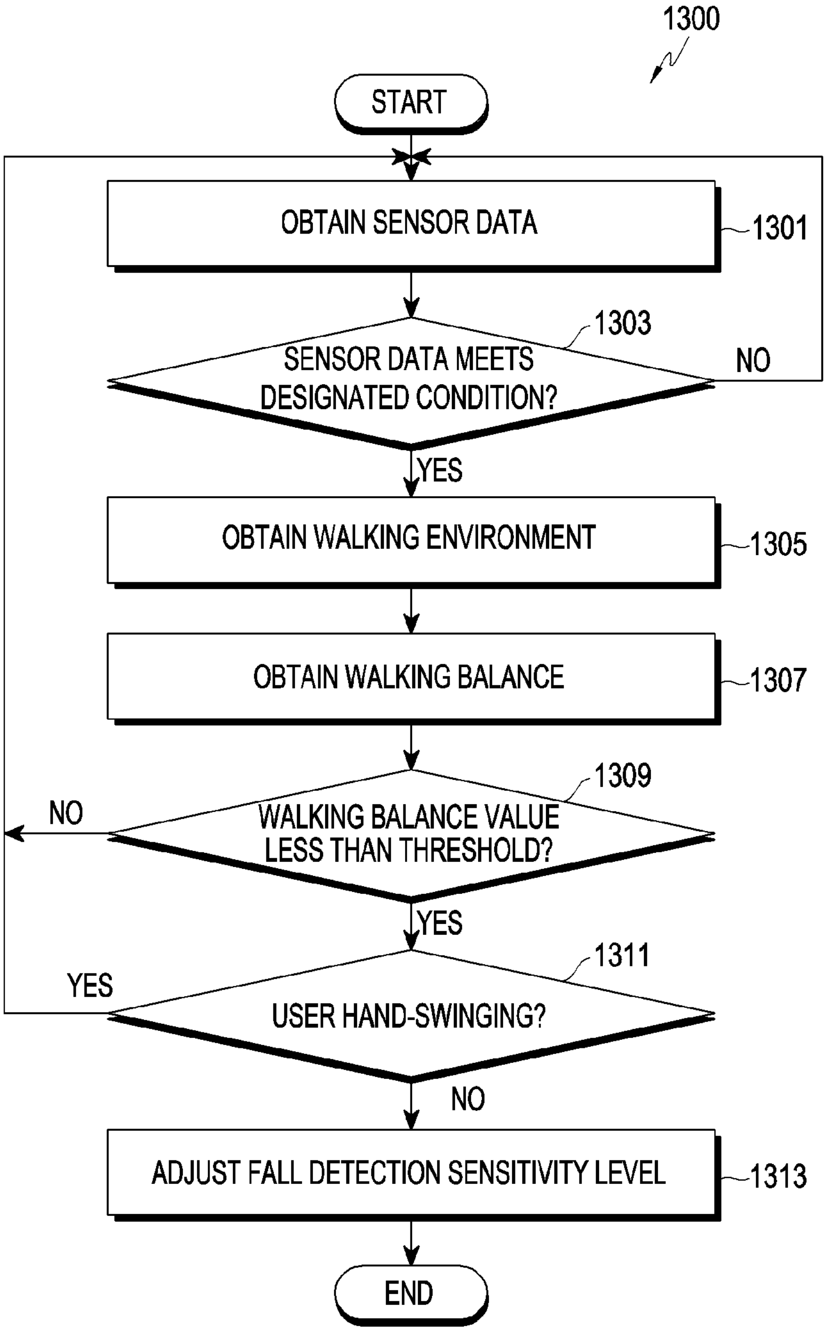
FIG. 13 is a flowchart illustrating an operation for setting a fall detection sensitivity level according to an embodiment.

FIG. 13 is a flowchart 1300 illustrating a method for setting a fall detection sensitivity level according to an embodiment.

In the following embodiment, the operations may be sequentially performed, but may be performed non-sequentially. For example, the order of the operations may be changed, and at least two operations may be performed in parallel.

Referring to FIG. 13, in operation 1301, in an embodiment, a processor (e.g., the processor 550 of FIG. 5) may obtain sensor data through a sensor (e.g., the sensor 530 of FIG. 5).

In operation 1303, in an embodiment, the processor 550 may identify whether a designated condition is met. For example, the processor 550 may identify whether the user wearing the first electronic device (e.g., the first electronic device 201 of FIG. 5) (and the second electronic device (e.g., the second electronic device 202 of FIG. 5) is walking (e.g., walking in the standing posture) and whether the number of steps of the user is greater than or equal to a designated number of steps, based on the obtained sensor data.

In an embodiment, the processor 550 may repeatedly perform the operation of obtaining the sensor data through the sensor 530 in operation 1301, based on identifying that the user is not walking or that the number of steps of the user is less than the designated number of steps.

In operation 1305, in an embodiment, the processor 550 may obtain a walking environment, based on identifying that the user is walking and the number of steps of the user is equal to or greater than the designated number of steps.

Since operation 1305 is at least partially the same as or similar to operation 1203 of FIG. 12, a detailed description thereof will be omitted.

In operation 1307, in an embodiment, the processor 550 may obtain the walking balance of the user through the sensor 530.

Since operation 1307 is at least partially the same as or similar to operation 1205 of FIG. 12, a detailed description thereof will be omitted.

In operation 1309, in an embodiment, the processor 550 may determine whether the value of the walking balance (e.g., the value indicating the walking balance) is less than a threshold.

In an embodiment, when the value of the walking balance (e.g., the value indicating the walking balance) is greater than or equal to the threshold, the processor 550 may repeatedly perform the operation of obtaining the sensor data through the sensor 530 in operation 1301.

In operation 1311, in an embodiment, the processor 550 may identify whether the user is hand-swinging while walking, based on identifying that the walking balance value is less than the threshold in operation 1309.

In an embodiment, the hand swing when walking may refer to an operation in which the user naturally shakes his/her arm forward/backward while walking. The hand swing while walking may offset the rotational force of the butt muscles of the user, thereby preventing the user's body from unintentionally rotating while increasing a sense of balance. The hand swing while walking, in particular, a hand swing while walking with a low walking balance, may prevent a fall.

In an embodiment, the processor 550 may receive information about whether the user is hand-swinging from the second electronic device 202 through a communication circuit (e.g., the communication circuit 510 of FIG. 5). For example, the second electronic device 202 may determine whether the user wearing the second electronic device 202 is hand-swinging, based on sensor data obtained through an inertial sensor (e.g., the inertial sensor 631 of FIG. 6). The second electronic device 202 may transmit information about whether the determined user is hand-swinging to the first electronic device 201 through the communication circuit 610. The processor 550 may determine whether the user is hand-swinging, based on the information received from the second electronic device 202 through the communication circuit 510.

In an embodiment, based on determining that the user is hand-swinging in operation 1311, the processor 550 may repeatedly perform the operation of obtaining sensor data through the sensor 530 in operation 1301. In an embodiment, when the user is hand-swinging while walking, the processor 550 may adjust the level of the fall detection sensitivity to be lower than the currently set level of the fall detection sensitivity. When the user is not hand-swinging while walking, the processor 550 may adjust the level of the fall detection sensitivity to be higher than the currently set level of the fall detection sensitivity.

In operation 1313, in an embodiment, the processor 550 may adjust the fall detection sensitivity level based on the walking environment, the walking balance, and/or whether the user is hand-swinging, based on determining that the user is not hand-swinging in operation 1311.

In an embodiment, the processor 550 may set an initial level of the fall detection sensitivity to level 1 as a default level. For example, when the first electronic device 201 is powered on, the processor 550 may set the level of fall detection sensitivity to level 1. However, embodiments of the disclosure are not limited thereto, and for example, the processor 550 may set the initial level of the fall detection sensitivity based on the user setting or the information set in the first electronic device 201. In an embodiment, when the initial level of the fall detection sensitivity is set, the processor 550 may adjust the initial level of the fall detection sensitivity based on the walking environment, the walking balance, and/or whether the user is hand-swinging.

Since operation 1313 is at least partially the same or similar to the operation 1207, no detailed description thereof is presented below.

Figure 14:
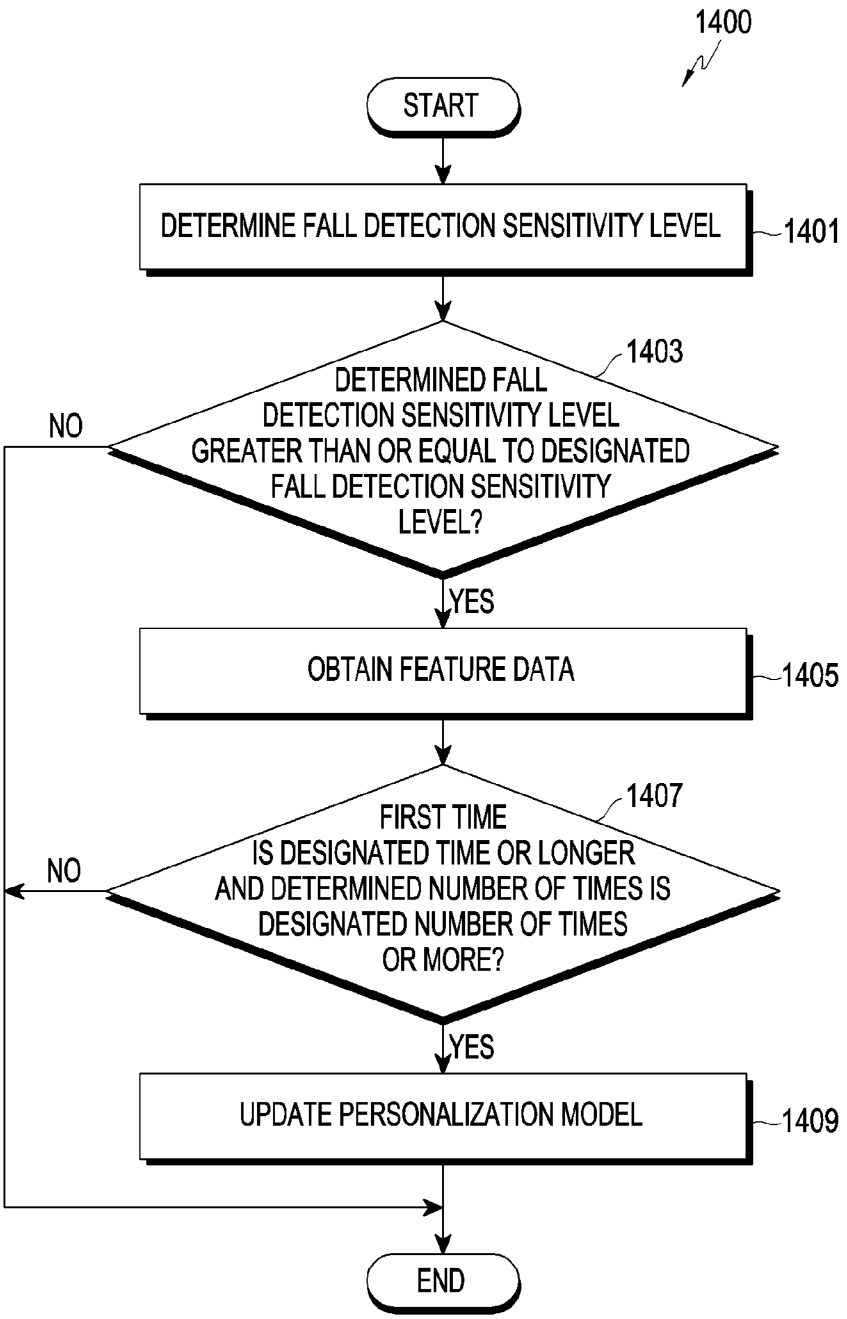
FIG. 14 is a flowchart illustrating an operation for updating a personalization model according to an embodiment.

FIG. 14 is a flowchart 1400 illustrating a method for updating a personalization model 541, according to an embodiment.

In the following embodiment, the operations may be sequentially performed, but may be performed non-sequentially. For example, the order of the operations may be changed, and at least two operations may be performed in parallel.

In an embodiment, the processor (e.g., the processor 550 of FIG. 5) may provide a fall warning notification, based on identifying that the designated condition is met. For example, the processor 550 may provide a notification indicating that there is a risk of the user's fall, based on identifying that the value indicating walking balance when the user walks is less than or equal to a designated value and that the user is not hand-swinging.

In an embodiment, when the processor 550 provides a fall warning notification whenever the designated condition is met, the user may feel uncomfortable due to the frequently provided fall warning notifications. Accordingly, the processor 550 may determine the time (or period) for providing the fall warning notification, based on the user's history related to the fall warning notification. In an embodiment, the personalization model (e.g., the personalization model 541 of FIG. 5) may be a model for setting a time (or period) for providing the fall warning notification, based on the user's history related to the fall warning notification.

Referring to FIG. 14, in operation 1401, in an embodiment, the processor 550 may adjust the fall detection sensitivity level.

In an embodiment, as described with reference to FIG. 12 or 13, the processor 550 may determine the level of the fall detection sensitivity, based on the walking environment, the walking balance, and/or whether the user is hand-swinging.

In an embodiment, the processor 550 may set the initial level of the fall detection sensitivity to level 1. For example, when the first electronic device 201 is powered on, the processor 550 may set the level of fall detection sensitivity to level 1 as a default level. However, embodiments of the disclosure are not limited thereto, and for example, the processor 550 may set the initial level of the fall detection sensitivity based on the user setting or the information set in the first electronic device 201. In an embodiment, when the initial level of the fall detection sensitivity is set, the processor 550 may adjust the initial level of the fall detection sensitivity based on the walking environment, the walking balance, and/or whether the user is hand-swinging.

In operation 1403, in an embodiment, the processor 550 may identify whether the determined fall detection sensitivity level is greater than or equal to a designated fall detection sensitivity level. For example, the processor 550 may identify whether the determined fall detection sensitivity level is equal to or greater than level 3 of Table 4.

In an embodiment, the processor 550 may not perform operations 1405 to 1409 (e.g., the operation of updating the personalization model 541), based on identifying that the determined fall detection sensitivity level is less than the designated fall detection sensitivity level.

In operation 1405, in an embodiment, the processor 550 may obtain (e.g., extract) feature data, based on identifying that the determined fall detection sensitivity level is equal to or greater than the designated fall detection sensitivity level.

In an embodiment, the feature data (hereinafter, referred to as "feature data") may include the determined fall detection sensitivity level (e.g., the fall detection sensitivity level determined at the current time), the time difference (hereinafter, referred to as a "first time") between the current time and the time (hereinafter, referred to as a "previous time") when the personalization model 541 is updated immediately before the current time (e.g., when the current time is 6:00 PM, and the previous time is 2:00 PM, the first time may be four hours), the number of times (hereinafter, referred to as a "determined number of times") when the fall detection sensitivity level is determined during the first time, and/or the user's feedback on the fall warning notification provided during the first time. In an embodiment, the user's feedback on the fall warning notification provided during the first time may be a response, input by the user during the first time, to the fall warning notification provided to the user according to a currently set period during the first time. In an embodiment, the user's feedback on the fall warning notification may include a positive type feedback and a negative type feedback. For example, the positive type feedback may be a response to the fall warning notification, indicating that the fall warning notification is helpful to the user, such as "It helped." For example, the negative feedback may be a response to the fall warning notification, indicating that the fall warning notification is not helpful to the user, such as "I do not want to receive a notification" or "No response" (e.g., when the user does not respond to the fall warning notification). However, the types of user feedback and examples of responses are not limited to the above-described examples.

In operation 1407, in an embodiment, the processor 550 may identify whether the first time (the time difference between the current time and the time when the personalization model 541 is updated immediately before the current time) is greater than or equal to a designated time and whether the determined number of times (the number of times when the fall detection sensitivity level is determined during the first time) is greater than or equal to a designated number of times.

In an embodiment, the processor 550 may not perform the operation of updating the personalization model 541 of operation 1409, based on identifying that the first time is less than the designated time or the determined number of times is less than the designated number of times.

In operation 1409, in an embodiment, the processor 550 may update the personalization model 541 based on identifying that the first time is greater than or equal to the designated time and the determined number of times is greater than or equal to the designated number of times. Hereinafter, a method for updating the personalization model 541 is described with reference to FIG. 15.

Figure 15:
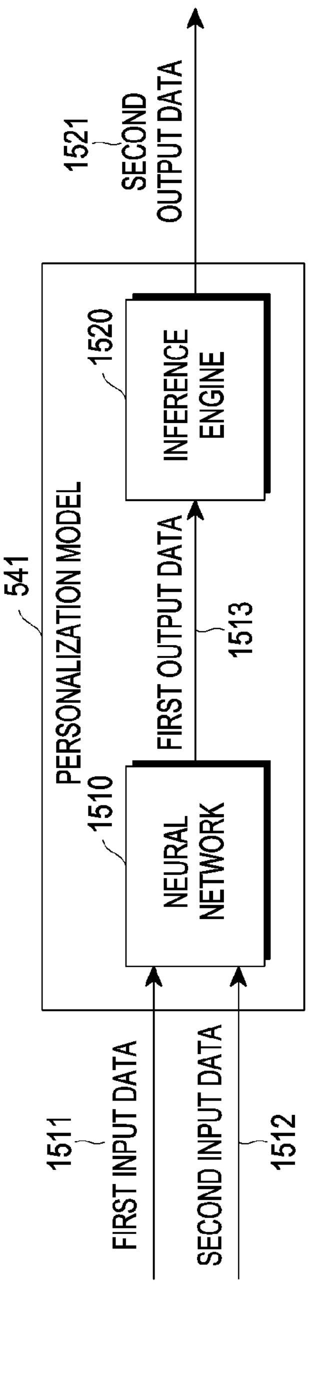
FIG. 15 is a view illustrating an operation for updating a personalization model according to an embodiment.

FIG. 15 is a view illustrating a method for updating a personalization model 541, according to an embodiment.

Referring to FIG. 15, in an embodiment, the personalization model 541 may include a neural network 1510 and an inference engine 1520.

In an embodiment, the neural network 1510 may include an artificial intelligence model that outputs the type of the user's feedback (e.g., positive type feedback or negative type feedback) and the walking habit (e.g., whether the user performs a hand swing when walking), based on the feature data. For example, the neural network 1510 may be an artificial intelligence model trained to output the feedback type of the user and the walking habit of the user as output data when feature data is input as input data.

In an embodiment, the inference engine 1520 (e.g., a knowledge base-based inference engine or an inference engine using fuzzy logic) may be an engine that outputs a period (or time) (e.g., a period for outputting a fall warning notification) based on the type of feedback of the user and the walking habit of the user (e.g., when the type of feedback of the user and the walking habit of the user are input as input data).

In an embodiment, as illustrated in FIG. 15, first input data 1511 and second input data 1512 may be input to the neural network 1510.

In an embodiment, the second input data 1512 may be feature data obtained at the current time. For example, the second input data 1512 may be feature data obtained in operation 1405 of FIG. 14.

In an embodiment, the first input data 1511 may be input data that was input to the neural network 1510 at the latest time when the personalization model 541 is updated. For example, the first input data 1511 may be input data input to the neural network 1510 as second input data at the latest time when the personalization model 541 is updated. However, embodiments of the disclosure are not limited thereto. In an embodiment, the first input data 1511 may be an average of input data input to the neural network 1510 as second input data when the personalization model 541 is updated before the current time. For example, the first input data 1511 may be an average of input data input to the neural network 1510 as second input data at a designated number of times when the personalization model 541 is most recently updated.

In an embodiment, when the first input data 1511 and the second input data 1512 are input as input data, the neural network 1510 may output the first output data 1513 (e.g., the feedback type of the user and the walking habit of the user) as output data.

In an embodiment, the neural network 1510 may output the value indicating that the higher the fall detection sensitivity level, the poorer the walking habit. In an embodiment, as the ratio of the determined number of times to the first time increases, the neural network 1510 may output a value indicating that the walking habit is relatively poor.

In an embodiment, the neural network 1510 may calculate a score for the feedback of the user, based on the fall detection sensitivity level, the first time, the determined number of times, and the feedback type of the user. In an embodiment, as the score for the user feedback is calculated as a value close to 0, the user feedback on the fall warning notification may be a more negative response, and as the score for the user feedback is calculated as a value close to 1, the user feedback on the fall warning notification may be a more positive response.

In an embodiment, when the first output data is input as the input data, the inference engine 1520 may output the second output data as the output data. For example, when the feedback type of the user and the walking habit of the user are input as the input data, the inference engine 1520 may output a period (or time) of the fall warning notification as the output data.

In an embodiment, when the period of the fall warning notification is output through the personalization model 541, the processor 550 may set (e.g., adjust) the output period of the fall warning notification to the period of the fall warning notification (e.g., the period of outputting the fall warning notification). When the time of the fall warning notification arrives according to the set fall warning notification period after the set fall warning notification period is set, the processor 550 may output the fall warning notification.

In an embodiment, although FIG. 14 illustrates that the first electronic device 201 (e.g., the processor 550) performs the operation of updating the personalization model 541, embodiments of the disclosure are not limited thereto. For example, the second electronic device 202, the third electronic device (e.g., a smartphone), a server (e.g., the server 108 of FIG. 1), the electronic device determined as the main electronic device, or the electronic device determined as the sub electronic device may update the personalization model 541.

Figure 16:
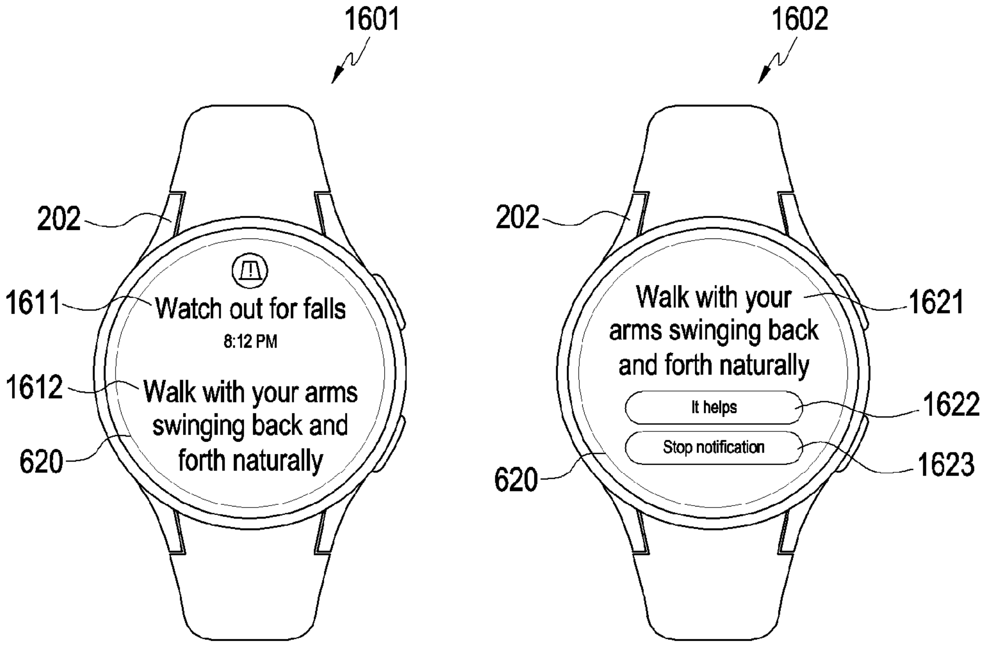
FIG. 16 is a view illustrating an operation for providing a fall warning notification according to an embodiment.

FIG. 16 is a view illustrating a method for providing a fall warning notification according to an embodiment.

Referring to FIG. 16, in an embodiment, the second electronic device 202 may display a fall warning notification through the display module 620.

In an embodiment, as indicated by reference numeral 1601, the second electronic device 202 may display, through the display module 620, information 1611 indicating that the user has a risk of falling and information 1612 guiding the user to perform a hand swing.

In an embodiment, as indicated by reference numeral 1602, the second electronic device 202 may display, through the display module 620, information 1621 for guiding the user to perform a hand swing and objects 1621 and 1623 for receiving user feedback on a fall warning notification. In an embodiment, when a user input to the object 1622 is input, the second electronic device 202 may determine that a positive user feedback for the fall warning notification is obtained. When a user input to the object 1623 is input or a user input to the objects 1622 and 1623 is not input, the second electronic device 202 may determine that a negative user feedback for the fall warning notification is obtained.

In an embodiment, although FIG. 16 illustrates that the second electronic device 202 displays a fall warning notification through the display module 620, embodiments of the disclosure are not limited thereto. For example, the second electronic device 202 may output the fall warning notification in a manner of outputting an audio through the speaker and/or in a manner of outputting vibration through the haptic module. For example, in addition to the second electronic device 202 or in place of the second electronic device 202, the first electronic device 201 or the third electronic device (e.g., a smartphone) may output a fall warning notification.

Figure 17:
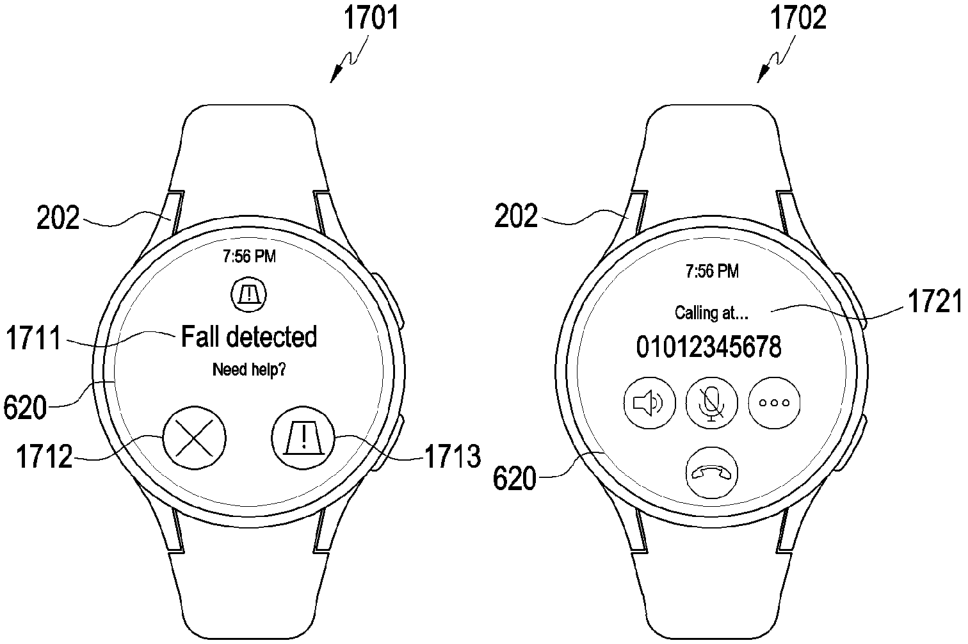
FIG. 17 is a view illustrating an operation for providing a fall detection notification according to an embodiment.

FIG. 17 is a view illustrating a method for providing a fall detection notification according to an embodiment.

Referring to FIG. 17, in an embodiment, the second electronic device 202 may output information (hereinafter, also referred to as a “fall detection notification”) indicating that a fall is detected, based on detection of the user’s fall. For example, the second electronic device 202 may output information indicating that the user’s fall is detected, in response to detection of the user’s fall. For example, the processor 550 may output information indicating that the user’s fall is detected, an inactivity time greater than or equal to a threshold inactivity time after the user’s fall is detected.

In an embodiment, as illustrated by reference numeral 1701 of FIG. 17, the second electronic device 202 may display, through the display module 620, information 1711 indicating that the user’s fall is detected (sensed), an object 1712 for terminating the fall warning notification, and an object 1713 for making a phone call with an electronic device having designated contact info (e.g., contact info about the user’s acquaintance and/or emergency contact info). In an embodiment, as illustrated by reference numeral 1702 of FIG. 17, when a user input to the object 1713 is input, the second electronic device 202 may make a call with the electronic device having the designated contact info (e.g., contact info about the user’s acquaintance and/or emergency contact info).

In an embodiment, based on the detection of the user’s fall, the second electronic device 202 may transmit, through the communication circuit (e.g., the communication circuit 610 of FIG. 6), data obtained by recording the user’s location and surrounding situation for a predetermined time to a designated contact (e.g., the user’s acquaintance contact and/or emergency contact).

In an embodiment, although FIG. 17 illustrates that the second electronic device 202 displays the fall detection notification through the display module 620, embodiments of the disclosure are not limited thereto. For example, the second electronic device 202 may output the fall detection notification in a manner of outputting an audio through the speaker and/or in a manner of outputting vibration through the haptic module. For example, in addition to the second electronic device 202 or in place of the second electronic device 202, the first electronic device 201 or the third electronic device (e.g., a smartphone) may output a fall detection notification.

Figure 18:
FIG. 18 is a view illustrating an operation for providing a notification related to a walking habit according to an embodiment.

FIG. 18 is a view illustrating a method for providing a notification related to a walking habit according to an embodiment.

Referring to FIG. 18, in an embodiment, the first electronic device 201 (or the second electronic device 202) may provide a fall warning notification indicating that there is a risk of the user's fall, based on identifying that the value indicating walking balance when the user walks is less than or equal to a designated value and that the user does not perform a hand swing. For example, the first electronic device 201 (or the second electronic device 202) may output information for guiding the user to perform a hand swing while walking. This fall warning notification may help enhance the user's walking habit.

In an embodiment, when the walking habit related to the walking balance and/or the hand swing of the user is enhanced, the first electronic device 201 (or the second electronic device 202) may output information indicating that the walking habit of the user is being enhanced. For example, as illustrated in FIG. 18, the second electronic device 202 may display, through the display module 620, information 1811 indicating that the walking habit of the user is enhancing and information 1812 indicating that a fall may be prevented when a hand swing is performed while walking.

Figure 19:
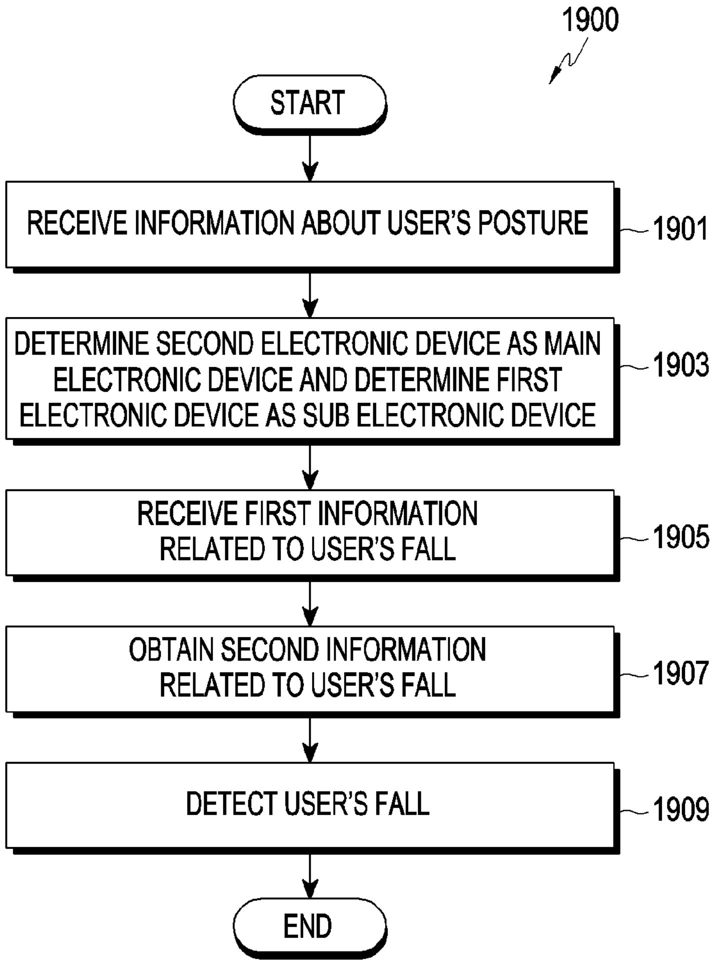
FIG. 19 is a flowchart illustrating an operation for detecting a user's fall according to an embodiment.

FIG. 19 is a flowchart illustrating a method for detecting a user's fall according to an embodiment.

In the following embodiment, the operations may be sequentially performed, but may be performed non-sequentially. For example, the order of the operations may be changed, and at least two operations may be performed in parallel.

Referring to FIG. 19, in operation 1901, in an embodiment, the processor 650 may receive information about the posture of the user wearing the first electronic device 201 and the second electronic device 202 from the first electronic device 201 connected to the second electronic device 202 through the communication circuit 610.

In an embodiment, the first electronic device 201 may determine whether the posture of the user wearing the first electronic device 201 and the second electronic device 202 is the standing posture or the sitting posture, based on sensor data obtained through the sensor 530. The processor 650 may receive information about whether the user's posture is the standing posture or the sitting posture from the first electronic device 201 through the communication circuit 610.

In operation 1903, in an embodiment, the processor 650 may determine the second electronic device 202 as a main electronic device and may determine the first external electronic device 201 as a sub electronic device, based on the user's posture being the sitting posture, based on the received information about the user's posture.

In an embodiment, the processor 650 may determine the first electronic device 201 as a main electronic device and determine the second external electronic device 202 as a sub electronic device, based on the user's posture being the standing posture, based on the received information about the user's posture.

In operation 1905, in an embodiment, the processor 650 may receive, from the first electronic device 201 through the communication circuit 610, first information related to the user's fall obtained by the first electronic device 201.

In an embodiment, as described in operation 705 of FIG. 7, the first electronic device 201 may obtain the first information related to the user's fall through the sensor 530. The processor 650 may receive, from the first electronic device 201 through the communication circuit 610, first information related to the user's fall obtained by the first electronic device 201.

In operation 1907, in an embodiment, the processor 650 may obtain second information related to the user's fall through the sensor 630. For example, the processor 650 may obtain a fall impact amount based on sensor data obtained through the inertial sensor 631. For example, the processor 650 may obtain an atmospheric pressure change amount based on sensor data obtained through the atmospheric pressure sensor 632. For example, the processor 650 may obtain the user's heart rate (e.g., the amount of change in the heart rate), based on sensor data obtained through the biometric sensor 633.

In an embodiment, the processor 650 may obtain second information, based on the fall impact amount, the atmospheric pressure change amount, and/or the heart rate.

In operation 1909, in an embodiment, the processor 650 may detect the user's fall by applying a first weight corresponding to the main electronic device to the second information and applying a second weight corresponding to the sub electronic device, which is lower than the first weight, to the first information.

An operation of detecting the user's fall by the second electronic device 202 has been described with reference to FIG. 19, but embodiments of the disclosure are not limited thereto. For example, the second electronic device 202 may perform operations identical or similar to at least some of the operations of the first electronic device 201 described with reference to FIGS. 7 to 18, thereby detecting the user's fall.

An electronic device (e.g., the first electronic device 201) according to an embodiment may comprise a communication circuit 510, a sensor 530, at least one processor 550, and memory (540) storing instructions. The instruction may be, when executed by the at least one processor 550, cause the electronic device 201 to determine whether a user wearing the electronic device 201 is in a standing posture, through the sensor 530. The instruction may be, when executed by the at least one processor 550, cause the electronic device 201 to determine that the electronic device (e.g., the first electronic device 201) is a main electronic device and an external electronic device (e.g., the second electronic device 202) connected to the electronic device (e.g., the first electronic device) is a sub electronic device, based on determining that the user is in the standing instruction may be, when executed by the at least one processor 550, cause the electronic device 201 to obtain first information related to the user's fall through the sensor 530. The instruction may be, when executed by the at least one processor 550, cause the electronic device 201 to receive second information related to the user's fall obtained by the external electronic device (e.g., the second electronic device 202), from the external electronic device (e.g., the second electronic device 202) through the communication circuit 510. The instruction may be, when executed by the at least one processor 550, cause the electronic device 201 to detect the user's fall by applying a first weight corresponding to the main electronic device to the first information and applying a second weight corresponding to the sub electronic device, which is lower than the first weight, to the second information.

In an embodiment, the instruction may be, when executed by the at least one processor 550, cause the electronic device 201 to obtain the user's waist posture and the user's hip joint angle through the sensor 530, and determine whether the user wearing the electronic device (e.g., the first electronic device 201) is in the standing posture or a sitting posture, based on the user's waist posture and the user's hip joint angle.

In an embodiment, the instruction may be, when executed by the at least one processor 550, cause the electronic device 201 to determine that the electronic device (e.g., the first electronic device 201) is the sub electronic device and the external electronic device (e.g., the second electronic device 202) is the main electronic device, based on determining that the user is in the sitting posture, and apply the second weight to the first information and the first weight to the second information to detect the user's fall, based on determining that the electronic device (e.g., the first electronic device 201) is the sub electronic device and the external electronic device (e.g., the second electronic device 202) is the main electronic device.

In an embodiment, the first information may be a probability of the user being in a fall situation, determined by the electronic device (e.g., the first electronic device 201) based on sensor data obtained through the sensor 530, and the second information may be a probability of the user being in a fall situation, determined based on sensor data obtained by the external electronic device (e.g., the second electronic device 202) through a sensor 630 of the external electronic device (e.g., the second electronic device 202).

In an embodiment, the instruction may be, when executed by the at least one processor 550, cause the electronic device 201 to add a value obtained by applying the first weight to the first information and a value obtained by applying the second weight to the second information, and determine that the user is in a fall situation based on identifying that the sum is a designated value or more.

In an embodiment, the instruction may be, when executed by the at least one processor 550, cause the electronic device 201 to output a notification indicating that the user's fall occurs, based on detecting the user's fall.

In an embodiment, the instruction may be, when executed by the at least one processor 550, cause the electronic device 201 to identify whether a value of a fall detection-related parameter obtained through the sensor 530 is a threshold or more, based on determining that the electronic device (e.g., the first electronic device 201) is the main electronic device, and request the second information from the external electronic device (e.g., the second electronic device 202) through the communication circuit 510, based on identifying that the value of the fall detection-related parameter is the threshold or more.

In an embodiment, the instruction may be, when executed by the at least one processor 550, cause the electronic device 201 to determine whether the user is walking through the sensor 530, obtain a walking environment in which the user is walking, through the sensor 530, based on determining that the user is walking, obtain the user's walking balance, and determine a level of fall detection sensitivity corresponding to the threshold, based on the walking environment and the walking balance.

In an embodiment, the instruction may be, when executed by the at least one processor 550, cause the electronic device 201 to set a period of outputting a fall warning notification using a personalization model 541, based on the user's feedback for the fall warning notification.

In an embodiment, wherein the electronic device (e.g., the first electronic device 201) may be a walking assistance device that further includes a supporting frame 320 or 325 for supporting the user's body when worn by the user and a driving module 520 generating an external force applied to a portion of the user's body through the supporting frame 320 or 325. The external electronic device (e.g., the second electronic device 202) may be a wearable device wearable on the user's wrist.

A method for detecting a user's fall by an electronic device (e.g., the first electronic device 201) according to an embodiment may comprise determining whether the user wearing the electronic device (e.g., the first electronic device 201) is in a standing posture, through a sensor 530 of the electronic device (e.g., the first electronic device 201). The method may comprise determining that the electronic device (e.g., the first electronic device 201) is a main electronic device and an external electronic device (e.g., the second electronic device 202) connected to the electronic device (e.g., the first electronic device 201) is a sub electronic device, based on determining that the user is in the standing posture. The method may comprise obtaining first information related to the user's fall through the sensor 530. The method may comprise receiving second information related to the user's fall obtained by the external electronic device (e.g., the second electronic device 202), from the external electronic device (e.g., the second electronic device 202) through a communication circuit 510 of the electronic device (e.g., the first electronic device 201). The method may comprise detecting the user's fall by applying a first weight corresponding to the main electronic device to the first information and applying a second weight corresponding to the sub electronic device, which is lower than the first weight, to the second information.

In an embodiment, determining whether the user wearing the electronic device (e.g., the first electronic device 201) is in the standing posture may include obtaining the user's waist posture and the user's hip joint angle through the sensor 530, and determining whether the user wearing the electronic device (e.g., the first electronic device 201) is in the standing posture or a sitting posture, based on the user's waist posture and the user's hip joint angle.

In an embodiment, the method may further comprise determining that the electronic device (e.g., the first electronic device 201) is the sub electronic device and the external electronic device (e.g., the second electronic device 202) is the main electronic device, based on determining that the user is in the sitting posture, and applying the second weight to the first information and the first weight to the second information to detect the user's fall, based on determining that the electronic device (e.g., the first electronic device 201) is the sub electronic device and the external electronic device (e.g., the second electronic device 202) is the main electronic device.

In an embodiment, the first information may be a probability of the user being in a fall situation, determined by the electronic device (e.g., the first electronic device 201) based on sensor data obtained through the sensor 530, and the second information may be a probability of the user being in a fall situation, determined based on sensor data obtained by the external electronic device (e.g., the second electronic device 202) through a sensor 630 of the external electronic device (e.g., the second electronic device 202).

In an embodiment, detecting the user's fall may include adding a value obtained by applying the first weight to the first information and a value obtained by applying the second weight to the second information, and determining that the user is in a fall situation based on identifying that the sum is a designated value or more.

In an embodiment, the method may further comprise outputting a notification indicating the user's fall occurs, based on detecting the user's fall.

In an embodiment, the method may further comprise identifying whether a value of a fall detection-related parameter obtained through the sensor 530 is a threshold or more, based on determining that the electronic device (e.g., the first electronic device 201) is the main electronic device, and requesting the second information from the external electronic device (e.g., the second electronic device 202) through the communication circuit 510, based on identifying that the value of the fall detection-related parameter is the threshold or more.

In an embodiment, the method may further comprise determining whether the user is walking through the sensor 530, obtaining a walking environment in which the user is walking, through the sensor 530, based on determining that the user is walking, obtaining the user's walking balance, and determining a level of fall detection sensitivity corresponding to the threshold, based on the walking environment and the walking balance.

In an embodiment, the method may further comprise setting a period of outputting a fall warning notification using a personalization model 541, based on the user's feedback for the fall warning notification.

In an embodiment, wherein the electronic device (e.g., the first electronic device 201) may be a walking assistance device that further includes a supporting frame 320 or 325 for supporting the user's body when worn by the user and a driving module 520 generating an external force applied to a portion of the user's body through the supporting frame 320 or 325. The external electronic device (e.g., the second electronic device 202) may be a wearable device wearable on the user's wrist.

An electronic device 202 according to an embodiment may comprise a communication circuit 610, a sensor 630, at least one processor 650, and memory (640) storing instructions. The instruction may be, when executed by the at least one processor 650, cause the electronic device 202 to receive information about a posture of a user wearing the electronic device 202 and an external electronic device 201 connected to the electronic device 202, from the external electronic device 201, through the communication circuit 610. The instruction may be, when executed by the at least one processor 650, cause the electronic device 202 to determine that the electronic device 202 is a main electronic device and the external electronic device 201 is a sub electronic device, based on the user being in a sitting posture. The instruction may be, when executed by the at least one processor 650, cause the electronic device 202 to receive first information related to the user's fall obtained by the external electronic device 201, from the external electronic device 201 through the communication circuit 610. The instruction may be, when executed by the at least one processor 650, cause the electronic device 202 to obtain second information related to the user's fall through the sensor 630. The instruction may be, when executed by the at least one processor 650, cause the electronic device 202 to detect the user's fall by applying a first weight corresponding to the main electronic device to the second information and applying a second weight corresponding to the sub electronic device, which is lower than the first weight, to the first information.

In an embodiment, the instruction may be, when executed by the at least one processor 650, cause the electronic device 202 to determine that the electronic device 202 is the sub electronic device and the external electronic device 201 is the main electronic device, based on the user being in a standing posture, and apply the second weight to the second information and the first weight to the first information to detect the user's fall, based on determining that the electronic device 202 is the sub electronic device and the external electronic device 201 is the main electronic device.

In an embodiment, in the electronic device 202, the sensor 630 may include an inertial sensor 631, an atmospheric pressure sensor 632, and/or a biometric sensor 633. The instruction may be, when executed by the at least one processor 650, cause the electronic device 202 to obtain the second information, based on a fall impact amount obtained through the inertial sensor 631, an atmospheric pressure change amount obtained through the atmospheric pressure sensor 632, and/or the user's heart rate obtained through the biometric sensor 633.

In an embodiment, the instruction may be, when executed by the at least one processor 650, cause the electronic device 202 to determine whether the user is hand-swinging, through the inertial sensor 631, and adjust a level of fall detection sensitivity, based on whether the user is hand-swinging.

In an embodiment, the electronic device 202 may further comprise a display module 620. The instruction may be, when executed by the at least one processor 650, cause the electronic device 202 to display, through the display module 620, a notification indicating that the user's fall occurs or transmit information related to the user's fall to the external electronic device 201 through the communication circuit 610 to allow the external electronic device 201 to output the notification, based on detecting the user's fall.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit;
a first sensor;
at least one processor; and
memory storing instructions,
wherein the instructions, when executed by the at least one processor, cause the electronic device to:
determine whether a user wearing the electronic device is in a standing posture, through the first sensor;
determine that the electronic device is a main electronic device and an external electronic device connected to the electronic device is a sub electronic device, based on determining that the user is in the standing posture;
obtain first information related to a fall of the user through the first sensor;
receive, from the external electronic device through the communication circuit, second information related to the fall of the user, wherein the second information is obtained by the external electronic device; and
detect the fall of the user, by applying a first weight corresponding to the main electronic device to the first information and by applying a second weight corresponding to the sub electronic device to the second information, the second weight being lower than the first weight.

2. The electronic device of claim 1, wherein the instructions, when executed by the at least one processor, further cause the electronic device to:
obtain, through the first sensor, a waist posture of the user and a hip joint angle of the user; and
based on the waist posture of the user and the hip joint angle of the user, determine whether the user is in the standing posture or a sitting posture.

3. The electronic device of claim 2, wherein the instructions, when executed by the at least one processor, further cause the electronic device to:
determine that the electronic device is the sub electronic device and the external electronic device is the main electronic device, based on determining that the user is in the sitting posture; and
based on determining that the electronic device is the sub electronic device and the external electronic device is the main electronic device, apply the second weight to the first information and apply the first weight to the second information to detect the fall of the user.

4. The electronic device of claim 1, wherein the first information corresponds to a first probability of the user being in a fall situation, the first information being determined by the electronic device based on first sensor data obtained through the first sensor, and
wherein the second information is a second probability of the user being in the fall situation, the second information being determined by the external electronic device based on second sensor data obtained by the external electronic device through a second sensor of the external electronic device.

5. The electronic device of claim 4, wherein the instructions, when executed by the at least one processor, further cause the electronic device to:
add a first value obtained by applying the first weight to the first information and a second value obtained by applying the second weight to the second information; and
determine that the user is in a fall situation based on identifying that a result of the adding is equal to or higher than a designated value.

6. The electronic device of claim 1, wherein the instructions, when executed by the at least one processor, cause the electronic device to, based on detecting the fall of the user, output a notification indicating that the fall of the user occurs or transmit, to the external electronic device through the communication circuit, information related to the fall of the user, and
wherein the external electronic device is configure to output the notification.

7. The electronic device of claim 1, wherein the instructions, when executed by the at least one processor, cause the electronic device to:
based on determining that the electronic device is the main electronic device, identify whether a value of a fall detection-related parameter obtained through the first sensor is equal to or higher than a threshold; and
based on identifying that the value of the fall detection-related parameter is equal to or higher than the threshold, request the second information from the external electronic device through the communication circuit.

8. The electronic device of claim 7, wherein the instructions, when executed by the at least one processor, further cause the electronic device to:
determine whether the user is walking through the first sensor;
based on determining that the user is walking, obtain, through the first sensor, a walking environment in which the user is walking;
obtain a walking balance of the user; and
based on the walking environment and the walking balance, determine a level of fall detection sensitivity corresponding to the threshold.

9. The electronic device of claim 8, wherein the instructions, when executed by the at least one processor, cause the electronic device to set a period of outputting the fall warning notification using a personalization model.

10. The electronic device of claim 1, wherein the electronic device is a walking assistance device that further includes a supporting frame configured to support the user's body and a driving module configured to generate an external force applied to a portion of the user's body through the supporting frame, and
wherein the external electronic device is a wearable device wearable on the user's wrist.

11. A method performed by an electronic device for detecting a fall of a user, the method comprising:
determining, through a first sensor of the electronic device, whether the user wearing the electronic device is in a standing posture;
determining that the electronic device is a main electronic device and an external electronic device connected to the electronic device is a sub electronic device, based on determining that the user is in the standing posture;
obtaining, through the first sensor, first information related to the fall of the user;
receiving, from the external electronic device through a communication circuit of the electronic device, second information related to the fall of the user, wherein the second information is obtained by the external electronic device; and
detecting the fall of the user by applying a first weight corresponding to the main electronic device to the first information and by applying a second weight corresponding to the sub electronic device to the second information, the second weight being lower than the first weight.

12. The method of claim 11, wherein the determining whether the user wearing the electronic device is in the standing posture comprises:
obtaining, through the first sensor, a waist posture of the user and a hip joint angle of the user; and
based on the waist posture of the user and the hip joint angle of the user, determining whether the user wearing the electronic device is in the standing posture or a sitting posture.

13. The method of claim 12, further comprising:
based on determining that the user is in the sitting posture, determining that the electronic device is the sub electronic device and the external electronic device is the main electronic device; and
based on determining that the electronic device is the sub electronic device and the external electronic device is the main electronic device, applying the second weight to the first information and the first weight to the second information to detect the fall of the user.

14. The method of claim 11, wherein the first information corresponds to a first probability of the user being in a fall situation, the first information being determined by the electronic device based on first sensor data obtained through the first sensor, and
wherein the second information corresponds to a second probability of the user being in the fall situation, the second information being determined by the external electronic device based on second sensor data obtained by the external electronic device through a second sensor of the external electronic device.

15. The method claim 14, wherein the detecting the fall of the user comprises:
adding a first value obtained by applying the first weight to the first information and a second value obtained by applying the second weight to the second information; and
determining that the user is in a fall situation based on identifying that a result of the adding is equal to or higher than a designated value.

16. An electronic device comprising:
a communication circuit;
a first sensor;
at least one processor; and
memory storing instructions,
wherein the instructions, when executed by the at least one processor, cause the electronic device to:
receive, from an external electronic device through the communication circuit, information about a posture of a user wearing both the electronic device and an external electronic device connected to the electronic device;
based on the user being in a sitting posture, determine that the electronic device is a main electronic device and the external electronic device is a sub electronic device;
receive, from the external electronic device through the communication circuit, first information related to a fall of the user, wherein the first information is obtained by the external electronic device;

obtain, through the first sensor, second information related to the fall of the user; and detect the fall of the user by applying a first weight corresponding to the main electronic device to the second information and by applying a second weight corresponding to the sub electronic device to the first information, the second weight being lower than the first weight.

17. The electronic device of claim 11, wherein the instructions, when executed by the at least one processor, further cause the electronic device to:

based on the user being in a standing posture, determine that the electronic device is the sub electronic device and the external electronic device is the main electronic device; and based on determining that the electronic device is the sub electronic device and the external electronic device is the main electronic device, apply the second weight to the second information and the first weight to the first information to detect the fall of the user.

18. The electronic device of claim 17, wherein the first sensor comprises at least one of an inertial sensor, an atmospheric pressure sensor, or a biometric sensor, and wherein the at least one processor is further configured to execute the at least one instruction to obtain the second information, based on at least one of: a fall impact amount obtained through the inertial sensor, an atmospheric pressure change amount obtained through the atmospheric pressure sensor, or the user's heart rate obtained through the biometric sensor.

19. The electronic device of claim 18, wherein the instructions, when executed by the at least one processor, further cause the electronic device to:

determine, through the inertial sensor, whether the user is hand-swinging; and based on whether the user is hand-swinging, adjust a level of a fall detection sensitivity.

20. The electronic device of claim 16, further comprising a display, wherein the instructions, when executed by the at least one processor, cause the electronic device to display, through the display, a notification indicating that the fall of the user occurs or transmit, to the external electronic device through the communication circuit, information related to the fall of the user, and wherein, based on detecting the fall of the user, the external electronic device is configured to output the notification.

* * * * *